US010990645B1

(12) United States Patent
Shi

(10) Patent No.: US 10,990,645 B1
(45) Date of Patent: Apr. 27, 2021

(54) SYSTEM AND METHODS FOR PERFORMING AUTOMATIC DATA AGGREGATION

(71) Applicant: Sophtron, Inc., Kenmore, WA (US)

(72) Inventor: Nanjuan Shi, Kenmore, WA (US)

(73) Assignee: Sophtron, Inc., Kenmore, WA (US)

( * ) Notice: Subject to any disclaimer, the term of this patent is extended or adjusted under 35 U.S.C. 154(b) by 207 days.

(21) Appl. No.: 16/127,764

(22) Filed: Sep. 11, 2018

Related U.S. Application Data

(60) Provisional application No. 62/614,741, filed on Jan. 8, 2018.

(51) Int. Cl.
*G06N 3/08* (2006.01)
*G06F 16/958* (2019.01)

(52) U.S. Cl.
CPC ............. *G06F 16/986* (2019.01); *G06N 3/08* (2013.01)

(58) Field of Classification Search
CPC ...... G06F 16/951; G06F 16/58; G06F 16/583; G06F 16/958; G06N 3/08
USPC .................................. 707/709, 710, E17.121
See application file for complete search history.

(56) References Cited

U.S. PATENT DOCUMENTS

| 8,121,970 B1* | 2/2012 | Tung | G06Q 30/0603 706/47 |
|---|---|---|---|
| 2014/0105488 A1* | 4/2014 | Geng | G06K 9/6265 382/161 |
| 2016/0012135 A1* | 1/2016 | Wang | G11C 14/0018 707/731 |

* cited by examiner

*Primary Examiner* — Robert W Beausoliel, Jr.
*Assistant Examiner* — Pedro J Santos
(74) *Attorney, Agent, or Firm* — FisherBroyles LLP

(57) ABSTRACT

Systems, apparatuses, and methods for automated data aggregation. In some embodiments, this is achieved by use of techniques such as natural language processing (NLP) and machine learning to enable the automation of data aggregation from websites without the use of pre-programmed scripts.

20 Claims, 13 Drawing Sheets

SYSTEM AND METHODS FOR PERFORMING AUTOMATIC DATA AGGREGATION

CROSS REFERENCE TO RELATED APPLICATIONS

This application claims the benefit of U.S. Provisional Application No. 62/614,741, entitled "System and Methods for Performing Automatic Data Aggregation," filed Jan. 8, 2018, which is incorporated by reference herein in its entirety (including the Appendix) for all purposes.

BACKGROUND

Data aggregation is the compiling of information or datasets from multiple databases, with the intent to prepare a combined dataset(s) for further search and/or data processing. Data aggregation is used in multiple industries and for multiple purposes, including marketing, fraud detection, background checks, insurance policy underwriting, law enforcement and the detection of criminal activity, financial transactions, etc. Data aggregators can sometimes gather account or other information from designated websites by using account holders' PINs or access codes, and then make the users' account information available to them (or to a designated other party) at a single website operated by the aggregator.

In addition to providing access to data from multiple sources, many businesses rely on a data aggregation service to provide a uniform data format and a single method of accessing data from multiple accounts, where the accounts are typically associated with multiple sources. One reason for the popularity of data aggregation services is that in some use cases (such as financial information or medical providers), there are simply too many sources for a business or other data consumer to cost-effectively access with their data acquisition infrastructure; for example, there are over 12,000 financial institutions in the US, each with its own website design and data schema or format.

In such a situation, it is not cost-effective or efficient for a business to devote the time and effort necessary to construct and maintain a way of accessing the multiple accounts at each of their associated sources. For example, an accountant or accounting firm may need to access financial records of its clients from multiple institutions. Rather than undertake the burden of developing scripts that can enable data acquisition from multiple sources, they may instead contract with a data aggregation service to obtain the data.

In addition to financial information obtained from financial institutions that may be used by accountants or other professional service providers, there is also a relatively high demand for data from data sources such as government agencies, hospitals, insurance companies, and utility companies, for example. Currently, access to such data may be through a myriad of websites, each implemented with a unique data schema, layout and flow between webpages or data fields.

As noted, conventional approaches to data aggregation suffer from one or more significant disadvantages. Thus, systems and methods are needed for more efficiently and cost-effectively performing data aggregation tasks. Embodiments disclosed herein are directed toward solving these and other problems individually and collectively.

SUMMARY

The terms "invention," "the invention," "this invention" and "the present invention" as used herein are intended to refer broadly to all of the subject matter described in this document and to the claims. Statements containing these terms should be understood not to limit the subject matter described herein or to limit the meaning or scope of the claims. Embodiments of the systems and methods described herein covered by this patent are defined by the claims and not by this summary. This summary is a high-level overview of various aspects of the systems and methods described herein and introduces some of the concepts that are further described in the Detailed Description section below. This summary is not intended to identify key, required, or essential features of the claimed subject matter, nor is it intended to be used in isolation to determine the scope of the claimed subject matter. The subject matter should be understood by reference to appropriate portions of the entire specification of this patent, to any or all drawings, and to each claim.

Embodiments are directed to systems, apparatuses, and methods for automating a data aggregation process. In some embodiments, this is achieved by use of advanced techniques, such as natural language processing (NLP) and machine learning to enable the automation of data aggregation from websites without the use of pre-programmed scripts.

One embodiment of the inventive system and methods is directed to an automated data aggregation system, where the system includes:
  an electronic processor programmed with a set of executable instructions;
  an electronic data storage in which are stored the set of executable instructions, wherein the set of instructions includes instructions, which when executed, cause the system to implement
  a first process to navigate to a specific website;
  a second process to identify and extract one or more features from a webpage accessed through the website, the webpage including one or more elements;
  a third process to export data related to the one or more features to a training repository;
  a fourth process operable to use data in the training repository to train an intent model and a target model;
  a fifth process to access a trained intent model operable to predict the webpage's intent based on the one or more features extracted from the webpage;
  a sixth process to access a trained target model operable to predict which of the one or more elements of the webpage to interact with in order to take an action associated with the predicted page intent; and a seventh process operable to execute the action by interacting with the one or more elements of the webpage predicted by the trained target model.

Another embodiment of the inventive system and methods is directed to a method for performing an automated data aggregation process, where the process includes:
  navigating to a specific website;
  identifying and extracting one or more features from a webpage accessed through the website, the webpage including one or more elements;
  exporting data related to the one or more features to a training repository;
  using data in the training repository to train an intent model and a target model;
  operating a trained intent model operable to predict the webpage's intent based on the one or more features extracted from the webpage;
  operating a trained target model operable to predict which of the one or more elements of the webpage to interact with in order to take an action associated with the predicted page intent; and executing the action by interacting with the one or more elements of the webpage predicted by the trained target model.

Other objects and advantages of the disclosed embodiments will be apparent to one of ordinary skill in the art upon review of the detailed description of one or more embodiments and the included figures.

BRIEF DESCRIPTION OF THE DRAWINGS

Embodiments in accordance with the present disclosure will be described with reference to the drawings, in which.

DETAILED DESCRIPTION

Figure 1:
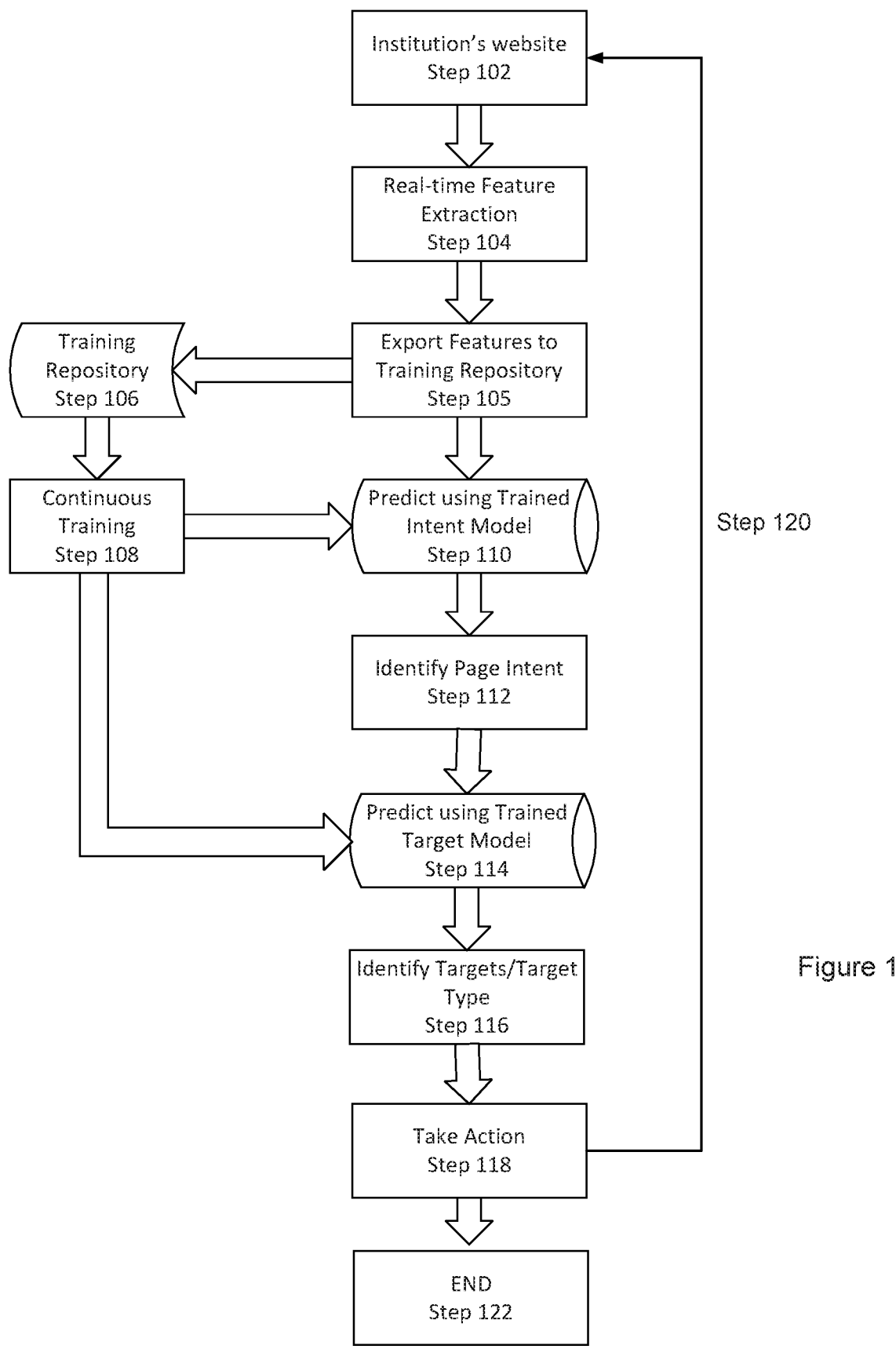
FIG. 1 is a flowchart or flow diagram illustrating a process, method, operation or function for performing data aggregation and that may be used in implementing an embodiment of the systems and methods described herein.

The subject matter of the embodiments disclosed herein are described with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments will be described more fully hereinafter with reference to the accompanying drawings, which form a part hereof, and which show, by way of illustration, exemplary embodiments which may be practiced. Note that the subject matter disclosed herein may be embodied in different forms and should not be construed as limited to the embodiments set forth herein; rather, these embodiments are provided so that this disclosure will satisfy the statutory requirements and convey the scope of the disclosure to those skilled in the art.

Among other things, the disclosed subject matter may be embodied in whole or in part as a system, as one or more methods, or as one or more devices. Embodiments may take the form of a hardware implemented embodiment, a software implemented embodiment, or an embodiment combining software and hardware aspects. For example, in some embodiments, one or more of the operations, functions, processes, or methods described herein may be implemented by one or more suitable processing elements (such as a processor, microprocessor, CPU, graphics processing unit (GPU), controller, etc.) that is part of a client device, server, network element, or other form of computing or data processing device/platform. The processing element or elements are programmed with a set of executable instructions (e.g., software instructions), where the instructions may be stored in a suitable non-transitory data storage element.

In some embodiments, one or more of the operations, functions, processes, or methods described herein may be implemented by a specialized form of hardware, such as a programmable gate array, application specific integrated circuit (ASIC), or the like. Note that an embodiment of the methods or processes described may be implemented in the form of an application, a sub-routine that is part of a larger application, a "plug-in", an extension to the functionality or available services of a data processing system or platform, or any other suitable form. The following detailed description is, therefore, not to be taken in a limiting sense.

As mentioned, conventional data aggregation services and efforts suffer from several disadvantages or sub-optimal aspects. These include one or more of the following:

existing data aggregation services rely on the availability of an API (Application Programming Interface) or pre-programmed scripts to access data from a source on behalf of their clients;
  note that the API enables a programmatic access to data and is hosted by the website itself; however, most websites offer no such API provided access;
pre-programmed scripts (software) are software instructions that while running, programmatically navigate and retrieve data from the websites on behalf of the account owner. However, such scripts rely on pre-existing knowledge of the website's layout and flow (i.e., the movement from element to element within a webpage and between pages). As a result, if a website changes its web layout and/or flow, then the script will "break" and not function as intended. Further, it typically requires a significant amount of resources to maintain such scripts; this is an important disadvantage to current approaches;
Due to the lack of API support for some websites, and the unreliability of pre-programmed scripts, there are frequent disruptions experienced by existing data aggregation services. At present, there is also a lack of data aggregation coverage for certain industries, such as utility, healthcare and insurance, due to the high cost of developing and maintaining pre-programmed scripts.

Note that with a process based on pre-programmed scripts (such as conventional approaches to data aggregation), it is assumed that each step in the script will be executed on a pre-set (i.e., previously defined/known) webpage. Conventional processes also assume that the webpage's HTML (Hyperlink Markup Language) DOM (Document Object Model) will contain a given Html Element. The script dictates or defines taking an "action" based on a specific Element, Typically, the action will either retrieve data it needs, or cause navigation to a different webpage. Once the action is performed, the script will dictate or define the next step to take. As is apparent, if the website changes its flow or the identification of a data field or action, then the script will not operate correctly.

In contrast, with the embodiments of the system and methods described herein, there is no presumed pre-existing knowledge of a page's HTML DOM, or of what action to take on the page. Instead, the embodiments described herein are directed to systems, apparatuses, and methods for more efficiently performing data aggregation across multiple sources without previously knowing the amount of information about a website's elements and flow required by conventional approaches. In a typical use case, the sources of the data are websites and embodiments operate or function to automate the aggregation of the data from multiple websites. Further, embodiments can automate the aggregation of the data from multiple websites independently of the website data schema or format, or of the website flow between webpages.

As noted, different websites (i.e., the sources of the data to be accessed and aggregated) may have different and in some cases inconsistent layouts and flow, and this can create a significant problem or obstacle to aggregating the data contained on the website. For example:

assume that website A has a Login page with a userID element <input type="text" id="UserID">User ID</input>, and a password element <input type="text" id="Password">Password</input>; for a manually written script to enter userID and password on this page, it must set userID to an element with a given id "UserID" and password to an element with a given id of "Password";

on Website B, the Login page may differ—it may be <input type="text" name="UserName">LogIn Name</input> and the password entry field shows on the second page after user clicks 'Next'. This requires a completely different script that set userID to an element with a given name of 'UserName' and to hold off setting text to password until after clicking the 'Next' button;

thus, to retrieve data from both Website A and Website B requires the data aggregator/consumer to write and maintain two completely different scripts. In a more realistic situation, instead of two sources of data, there may be hundreds of such sources (or more), each with its own website design, element names, and flow.

The embodiments described herein (and others based on those) enable the automation of the data aggregation process without using such scripts. This is at least in part because of the following features or aspects of one or more of the embodiments:

embodiments use natural language processing (NLP) and/or machine learning (ML) techniques to automate data aggregation from websites without use of pre-programmed scripts;

embodiments can retrieve data from a website "as is", In some cases, embodiments simulate or model how a human brain would perceive and acquire data from the website, which is independent from the underlying website implementation. Embodiments make a decision on which action to take at runtime during the embodiment's execution. If a website changes its layout or flow, embodiments can adjust to the change automatically. Among other aspects, this enables embodiments of the data aggregation service described herein to achieve higher reliability while incurring lower (or no) maintenance cost;

embodiments remove the dependency on a website API for use in data aggregation; and conventionally, it may take hundreds or thousands of software developer-hours of work to write a sufficient set of pre-programmed scripts and to maintain them. However, in contrast, embodiments are capable of operating using a minimal set of training data; this makes it easier to expand the data aggregation service to industries not presently accessible or sufficiently accessible, such as utility, healthcare and insurance.

FIG. 1 is a flowchart or flow diagram illustrating a process, method, operation or function for performing data aggregation and that may be used in implementing an embodiment of the systems and methods described herein. As shown in the diagram, an example implementation of an embodiment of the system and methods described herein may start with navigating to the institution's website (as suggested by stage or step 102), Note that conventional approaches to data aggregation would look for a pre-programmed HTML (Hypertext Markup Language) DOM (Document Object Model) Element on the current webpage to interact with. In contrast, the data aggregation process(es) described herein have no prior knowledge of which Elements to interact with. Instead, the described embodiments extract information from the current web page, including HTML DOM, page image and page texts, in real time as "Features" (as suggested by stage or step 104). In this context, Features refers to measurable properties or characteristics, or attributes, found in the given problem set. Features are used as input variables to help build a predictive model or to make predictions. Note that as used herein, a predictive model or the operation of making a prediction refers at least (but not exclusively) to determining or deciding a most likely, probable, or expected state, condition, identification, classification, explanation, goal, purpose, function, etc.

By way of further explanation, in the context of the described embodiments, features can be regarded as input variables or parameters, and the "model" can be regarded as a complicated multivariable function, where the coefficients of variables are determined through a training process. In the example of predicting the "intent" of a web page (which may be characterized as the purpose, function, capability, or goal of that page), the features of the current page (e.g., HTML DOM, page image, and page texts) are converted into numerical values for the variables. Some values are in the form of multi-dimensional numerical vectors. The variable values are then "inserted" into the multivariable function, which outputs a numerical vector that represents the probability of the current page being of each intent type. For example, if there are 10 intent types, the output will be a 1×10 vector with each element representing the probability of how likely the given page can be classified as corresponding to or representing the indicated intent type. Given the "prediction" result(s), the process will typically select the intent type with the greatest probability as the current page's intent.

Note that the extracted features are provided/exported (stage or step 105) to a training repository 106 (such as a local or remote data storage medium) and used in a training process (as suggested by stage or step 108). Training step 108 (which may be termed part of a continuous training or updating process) is used to incorporate the extracted features and information (such as metadata, labels, or other characteristics) into the trained intent and target models (as represented by the paths between continuous training step 108 and the Intent and Target models at steps 110 and 114).

The extracted features are sent to the trained Intent model (as illustrated in step or stage 110) to predict (i.e., to determine, decide, identify, select, etc.) in real time which type of intent (or purpose, goal, function, etc.) is represented by or associated with the current web page; for example, whether the current page provides for the ability to perform a specific function or access a type of data, such as "Login", "Dashboard", "Download", etc. (note that this may include other types or categories, such as a specific intent, purpose, operation, etc.). Based on the intent type predicted by the model (as suggested by stage or step 112), and a record of the previous steps taken during the aggregation process, the data aggregation process then sends the extracted features to a trained target model (as suggested by stage or step 114), to "predict" which target type each HTML Element in the current page represents (or is associated with or corresponds to, as suggested by stage or step 116). Note that typically, each target can be interacted with to perform a certain "action".

In some embodiments, actions are predefined based on target type and are applicable to all websites. For example, an element with "UserNameTarget" target type is typically a textbox for a user to enter their username. An action defined for the "UserNameTarget" type element may be to set its innerText to the entered username. Similarly, an element with "LoginTarget" target type is typically a button or link for a user to click or select in order to log in. An action defined for the "LoginTarget" type element may be to invoke a "click" or "select" function on the element. In general, embodiments initiate or take actions against target elements, in a manner similar to how a human user interacts with the website or webpage to navigate and retrieve/access information.

An action on the target (executed at step 118) may trigger a page navigation or HTML DOM change, which will lead to the next iteration of the process (as suggested by path/step 120 and its return of control to accessing the website, and hence possibly a new webpage at step 102), until the process achieves its goal and exits/terminates (as suggested by stage or step 122).

Figure 2:
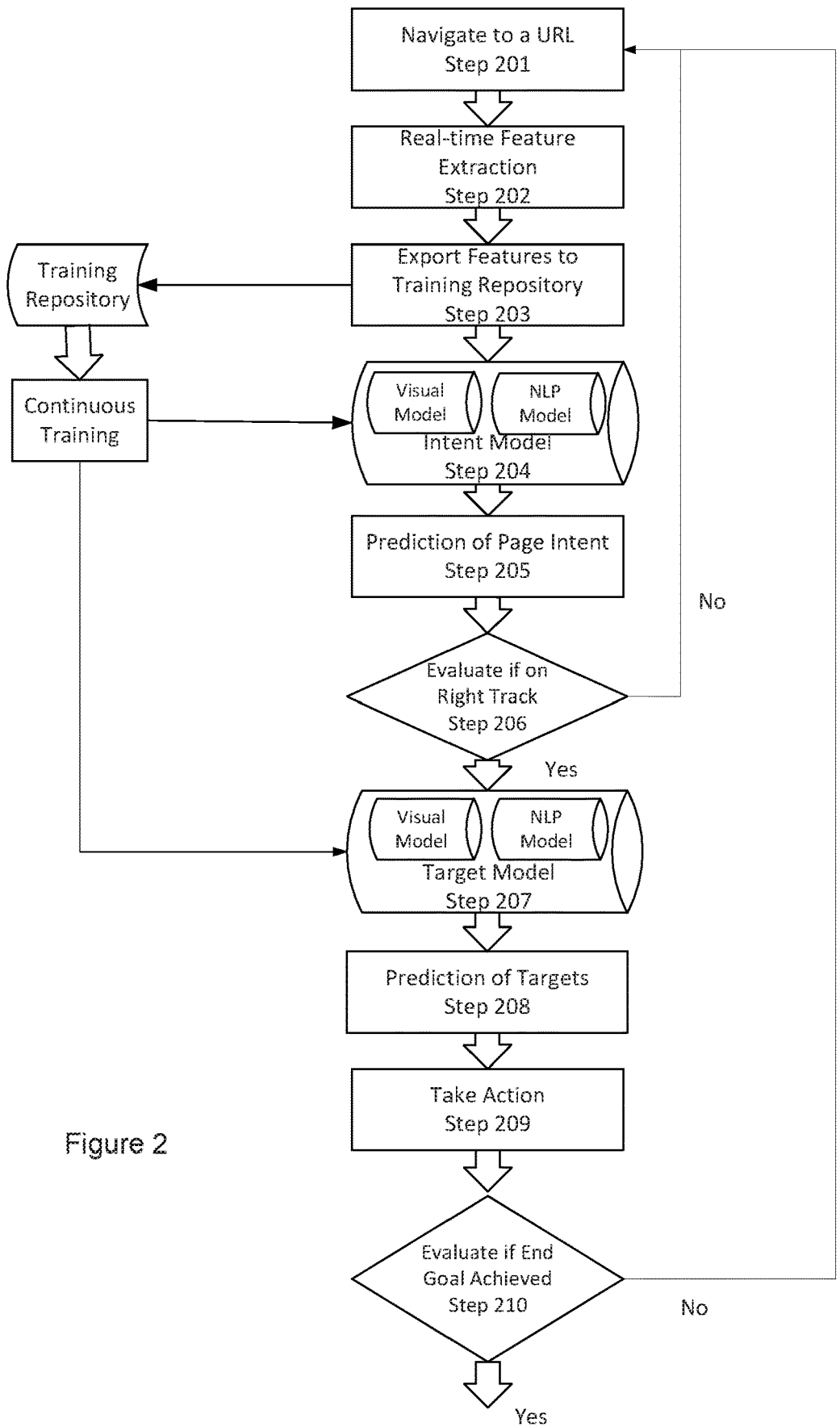
FIG. 2 is a more detailed flowchart or flow diagram illustrating a process, method, operation or function for performing data aggregation and that may be used in implementing an embodiment of the systems and methods described herein.

FIG. 2 is a more detailed flowchart or flow diagram illustrating a process, method, operation or function for performing data aggregation and that may be used in implementing an embodiment of the systems and methods described herein. As shown in the figure, an embodiment may involve one or more of the following steps or stages:

Step 201: assuming a goal of downloading transactions from a company, Utility A, start by navigating to the home web page of UtilityA.com;

Step 202: extract features from the home page, such as HTML DOM, visual layout of the page, and text in the page;

Step 203: export the extracted text, DOM data and visual layout data (and/or other extracted features) to a data storage medium (typically remote and server based, and termed a "Training Repository" in the figure) for purposes of continuous training (as suggested by the stages or steps referred to as "Continuous Training" in the figure):

Note that "continuous training" refers to updating the set of training samples during the overall data aggregation process. In training a model, certain characteristics of the model are determined by the training data; for example, the training data may determine or calculate one or more model parameters, such as the coefficients of the features. Typically, by increasing the amount of training data available, the error is reduced, and the model's accuracy is improved. Thus, in embodiments of the data aggregation process described herein, newly extracted features are added to the training data repository and used to update and improve the model(s);

Step 204: form a multiple-component model that combines one or more machine learning and/or natural language processing technologies (NLP) to model the input features for classification. For example, image recognition technologies may be used to analyze a page's visual data. As recognized by the inventor, this enables embodiments to implement image classification, as well as object detection and segmentation of the page image to model the page layout semantically. NLP technologies may be used in combination with machine learning technologies to analyze DOM data and page text data. As recognized by the inventor, this enables embodiments to take advantage of the linguistic techniques of NLP, such as lemmatization, stemming, POS (part-of-speech) tagging, word embedding, etc. Techniques such as stemming and/or lemmatization are of possible value, as they may help with dimension reduction for features. Other of the techniques, such as POS tagging and word embedding, often utilize models trained on large annotated text corpora, which adds syntactic and semantic information that are beyond observations; this can augment and enhance the features extracted, which is expected to improve a model's accuracy;

For visual layout, embodiments may utilize a Neural Network such as a CNN (Convolutional Neural Network) to classify or identify the page intent (or goal, purpose, or function). The visual model may further perform object detection and segmentation of the current page, using convolutional neural network and non-max suppression, to identify key areas of the page and juxtaposition among key areas. This enables embodiments to model the page layout semantically. The key areas' DOM and text information are sent to the NLP model for further classification;

For DOM and text, embodiments may utilize a Neural Network such as RNN (Recurrent Neural Network), or a classifier such as Decision Tree, Support Vector Machine (SVM), Naive Bayes, Max Entropy for classification of each key area;

For DOM and text modeling, embodiments may incorporate modeling results from Natural Language Processing (NLP) technologies such as Stemming and Lemmatization, POS tagging (part-of-speech tagging), Word Embedding, CRF (Conditional Random Fields), LDA (Latent Dirichlet allocation) or LSA (Latent Semantic Analysis);

The predicted results from both the visual and other (such as NLP) models are ensembled with an algorithm such as Bagging methods, Random Forest, AdaBoost, Gradient Tree Boosting, Stacking, or Voting Classifier to predict the ultimate intent type for the whole page.

Step 205: Intent (or function/purpose, etc.) of the current webpage determines how (or if) the end-goal can be achieved through the current page: for example; if the end-goal is to download transactions from Utility A company, and the current page is of intent type "Login", then the current page is expected to complete the "Login" process. Similarly, if the current page is of intent type "Dashboard", then the current page is expected to complete "Selection of the given account in the dashboard" process; similarly, with intent type of "Download", then the current page would be expected to complete the "Download" process;

Step 206: evaluate the intent(s) (or in other words, the goals, objectives, functions or stages) achieved so far, and determine if the current intent is on track for successful completion:

In some embodiments, the embodiment keeps track of every step it has taken from the beginning of the data aggregation process. It stores which intents have been achieved and which elements have been interacted with each step of the way. It also remembers a list of "candidate" elements that might be acted upon. Note that further details regarding how candidate elements are identified is described in step 208. When encountering a new intent, it will be compared with the previous intent(s) to determine if the process is proceeding correctly. For example, if so far, the intents achieved have been Login→Dashboard, and the new intent encountered is "Login" again, then this indicates that the process is not proceeding correctly towards the end goal of being able to download transaction records;

however, if the intent(s) achieved have been: Login→Dashboard→(will be) Download, it is on the right track to successful completion;

If the process is not proceeding correctly; then the current state is corrected by going back to the previous page (as suggested by the path from the "No" result of Step 206 to Step 201), and use the tracked target elements to self-correct the action;

By this is meant that if the process is not proceeding correctly; then it means the previous action was taken on an incorrect element. In this situation, the process restores the current page to the previous page, and since an incorrect element was interacted with, the process selects a different element to act upon. As embodiments of the data aggregation process track the previous element acted upon, as well as a list of "candidate" elements to act upon, the process will pick/select the remaining candidate element with the highest predicted probability to retry the action on the current page;

Step 207: Features extracted for (or from) every HTML DOM element in the current web page at step 202 are sent to a multi-component target model that "predicts" which target type or category the element belongs to. In some embodiments, target types are a set of predefined categories for actionable elements. Target types are defined and typically stored in a suitable data storage medium—note that the medium or data storage element may include configuration files, embedded resource files, a database etc. The target types are typically generic and applicable to most any website without prior knowledge of the website's specific implementation details; in this sense, a target type represents a generic or canonical capability or function of a web page (e.g., data entry, selection of an option, entry of login username and password; etc.);

With regards to the description of Target types as being predefined (as opposed to discovered or identified) categories, note that Target types are limited, as most websites share a common pattern, and overall, at present, there are possibly no more than a few hundred target types across all websites;

For example, having a username textbox is standard for any website using login credentials, and such a textbox, regardless of its label or id as defined in different webpages, is categorized as "UserNameTarget" in embodiments of the systems and methods described herein;

Similarly, a textbox for a user to enter a password is categorized as "PasswordTarget" in embodiments of the systems and methods described herein; and As another example, websites that allow users to download a transaction history typically have a button or link for users to select/click to initiate the downloading process. Such a button is categorized as a target type "DownloadTarget";

if the methods described herein were desired to be used on a different or expanded set of Target types, then the additional or different Target types would need to be discovered, identified or otherwise added. One possible method of doing this discovery or identification is to utilize unsupervised learning to group elements into "clusters" of potential target types. Instead of manually defining and labeling target types, this enables a system to automatically identify clusters of similar elements, and treat each cluster as a potential target type. This approach may be implemented by use of machine learning technologies such as "K-means", "LDA".

Returning to the embodiments of the system and methods being described herein, in some embodiments, the system and methods enumerate every HTML DOM element in a web page and provide the extracted features as an input to the target model, which then outputs a numerical vector representing a probability or likelihood of the element corresponding to each target type. In some embodiments, the target type with the greatest probability is chosen as the target type of the HTML element.

For visual layout, embodiments may utilize a Neural Network such as a CNN (Convolutional Neural Network), a classifier such as SVM (Support Vector Machines), or a Decision Tree for classification or identification of an image;

For DOM and text, embodiments may utilize a Neural Network such as a RNN (Recurrent Neural Network), a classifier such as Decision Tree, Support Vector Machine (SVM), Naive Bayes, Max Entropy for classification;

For DOM and text modeling, embodiments may incorporate modeling results from Natural Language Processing (NLP) technologies such as Stemming and Lemmatization, POS tagging (part-of-speech tagging), Word Embedding, Conditional Random Fields (CRF), LDA (Latent Dirichlet allocation) or LSA (Latent Semantic Analysis);

The predicted results from the visual model and NLP model may then be ensembled with an algorithm such as Bagging methods, Random Forest, AdaBoost, Gradient Tree Boosting, Stacking, or Voting Classifier to achieve better prediction performance.

Step 208: rank the elements by predicted probability for each target type:

The DOM element with the highest predicted probability for the given target type is typically chosen as the target element—for example, assume that with "Download-Target" as the target type, there are two DOM elements predicted to be of this type: a <button id="downloadButton">Download<button>, with a predicted probability of 0.80; and a second <a id="help">Need help with download?</a> with a predicted probability of 0.30. In this example, the download button has the greatest probability, and therefore is chosen as the DownloadTarget element. The help anchor element, with a lower probability, may be added to the candidate list for "DownloadTarget" type for the current page;

Track the selected target element(s) throughout the process for evaluation (in the manner described with reference to Step 206). If this element has already been selected and acted upon in a previous iteration, then it indicates that no navigation event or DOM change occurs from the previous action, or that an incorrect navigation has taken place—therefore, skip this element and choose the one with next highest probability instead. If no more elements remain, generate an error or notification and exit the program;

Step 209: access a knowledge-base or other data or information repository to determine which action to take with a given DOM element; the knowledge base is typically predefined and stored in a suitable storage medium—it may include configuration files, embedded resource files, database, etc. The knowledge base defines rules that are generic to HTML DOM Elements and are applicable to most websites without pre-existing knowledge of the website implementation:

for example, with <input> element with type="text", the action to take is "Set InnerText"—for example if Step 208 determines that the target element is "<input type="text" id="UserName">User Name</input> element", then at Step 209 the action to take is to set the InnerText of the <input type="text" id="UserName">User Name</input> element to be <input type="text" id="UserName">given user-Name</input>, or;

with <button> element, the action to take is invoke "Click" or "Select"—for example if Step 208 determines that the target element is "<button id="downloadButton">Download</button>", then at Step 209 the action to take is to invoke "Click" on <button id="downloadButton">Download</button> element;

Step 210: Evaluate if the end goal has been achieved; if so, exit the program. If not, then the Action taken at Step 209 may trigger a navigation event to a new page or DOM changes on the current page, both of which lead to repeating of the stage or process at Step 201 until the end-goal is achieved (as suggested by the path from Step 210 to Step 201).

As mentioned, the embodiments of the system and methods described herein do not rely on pre-existing knowledge of a page's HTML DOM, or of what action to take on the page. When an embodiment navigates to a website page, it will not only extract the HTML DOM information, but also other information, including page image and page text, as "features". Page image usually includes a screenshot of the page. Text data on a webpage includes both readable texts from elements' innerText as well as text attributes such as "id", "name", and "title". The following aspects of one or more embodiments are also noted:

if an embodiment decides that the current page is the correct page to be on, then the process evaluates which action to take on that page;

embodiments have no prior knowledge of which HTML Element to use to initiate an action—instead, the process uses the extracted features with a trained model, which may be used to "predict" what Element is the target element (e.g., <button id="downloadButton">Download</button>); and embodiments typically have a pre-defined action associated with a given HTML Element target type—for example, with a "DownloadTarget", the process performs a "Click" or "Select" action.

Note that in contrast to conventional approaches, with use of an embodiment of the system and methods described herein, if a webpage changes a button id from "download" to "download1", it has no impact on the execution of the data aggregation process.

Figure 3A:
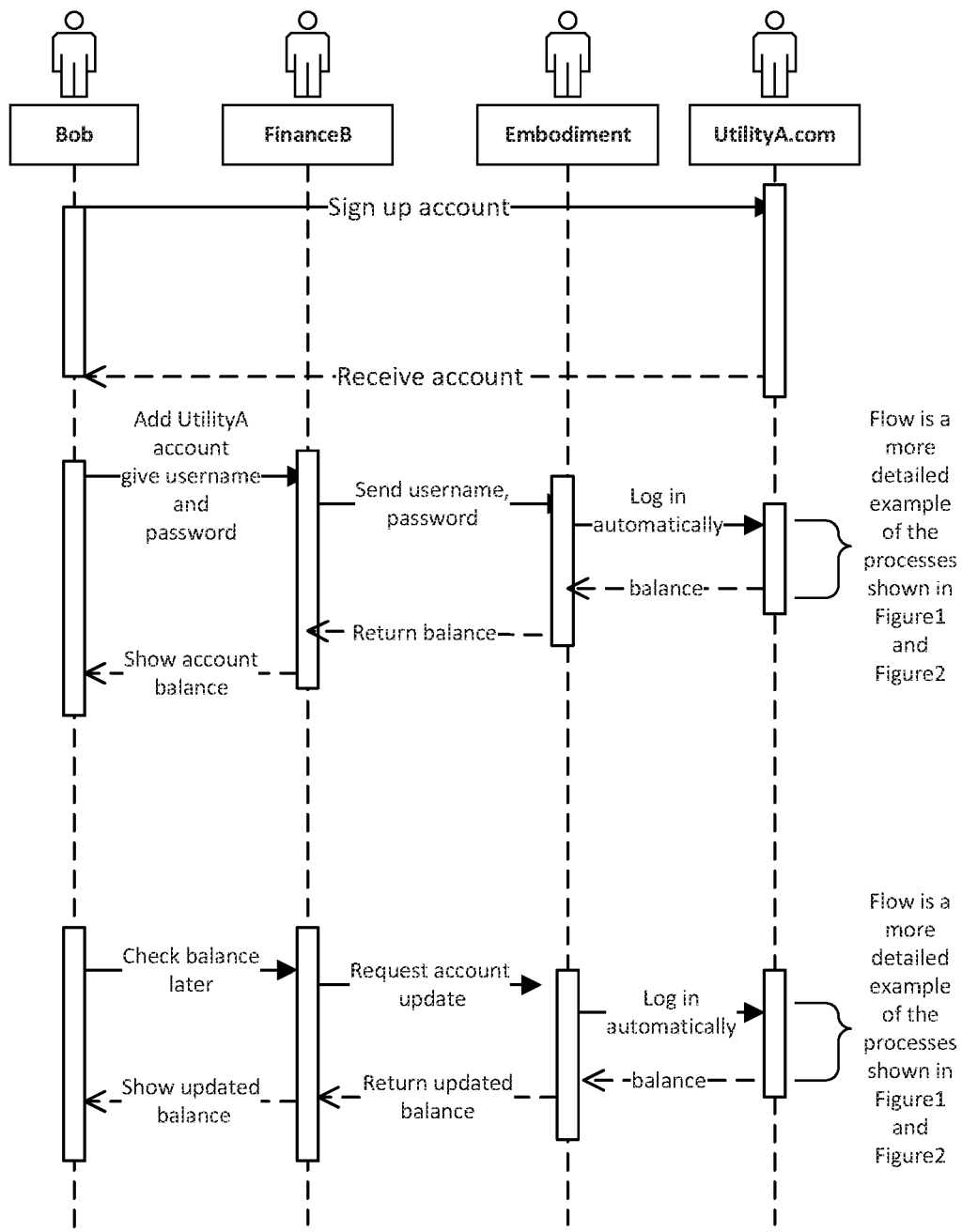
FIGS. 3(a) and 3(b) are diagrams illustrating a first example use case that involves an application of an embodiment of the automated data aggregation system and methods described herein, along with a flow diagram illustrating the steps or stages that may be implemented.

FIGS. 3(*a*) and 3(*b*) are diagrams illustrating a first example use case that involves an application of an embodiment of the automated data aggregation system and methods described herein, along with a flow diagram illustrating the steps or stages that may be implemented.

Example Use Case 1

Bob has signed up at a city's utility service's website, UtilityA.com. He has created an account with username: Bob@bob.com, password "Bob1234". He owns property, Property1 Bob wants to track his utility expenses in his personal financial tool, FinanceB, automatically without repetitively logging into his utility account. There are tens of thousands of utility companies in the US alone, most of which offer no API support. For a conventional data aggregation service, it would be expected to take a large number of developers (and multiple person-years of effort) to support all of the utility companies;

In contrast, using one or more of the embodiments described herein, it only requires a small training sample and a short period of time to provide a data aggregation service for utility service data from a large number of such services (if not all) throughout the country. Note that if a utility company changes their website, then the embodiments can adjust to the change automatically without manual intervention;

Bob opens FinanceB, which enables him to send his utility account's username and password to the system or service platform that implements an embodiment of the data aggregation service described herein. The system or service platform automatically retrieves Bob's current account balance from UtilityA.com and sends data back to FinanceB. Bob can now see his utility expenses in FinanceB. Afterwards, whenever Bob opens FinanceB, it automatically "calls" or accesses the system or service platform to update the utility account balance, and the system or service platform keeps the account balance updated behind the scene. Bob can now track his utility expenses and reconcile his bank payments with utility bills more easily.

Figure 3B:
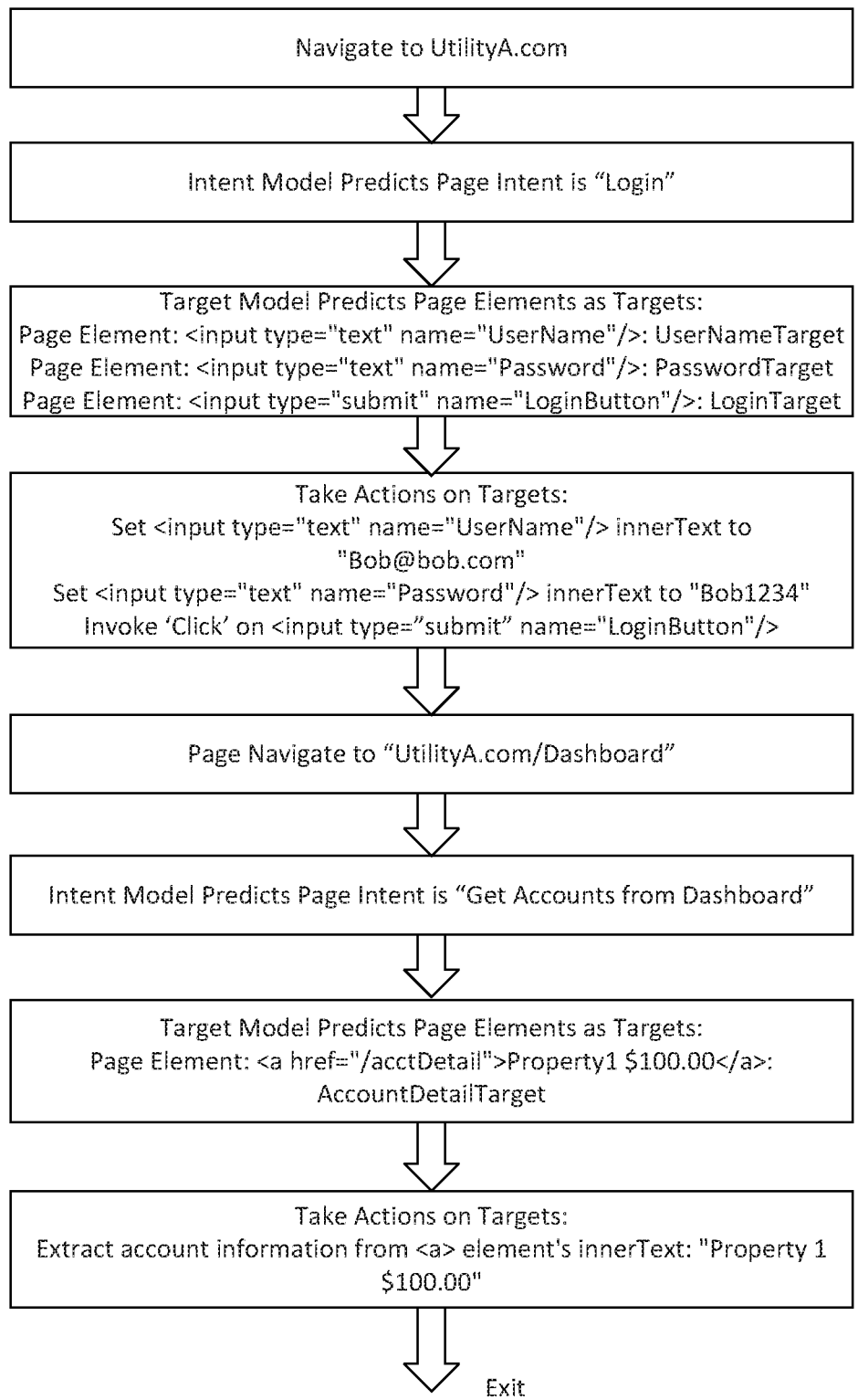

FIG. 3(b) is a diagram illustrating a process or method for how the service platform may implement an embodiment that automatically retrieves Bob's current balance information from UtilityA.com:

1: As suggested by stage or step 201 in FIG. 2: the process navigates to UtilityA.com;
2. As suggested by stages or steps 202, 203, 204 and 205 in FIG. 2: the process extracts "features" from the page and provides them to the trained intent model, which for example predicts that the current page intent to be "Login";
3. As suggested by stage or step 206 in FIG. 2: after evaluating the page intents tracked so far, the process decides that the process is on the right track;
4. As suggested by stages or steps 207 and 208 in FIG. 2: the process feeds the features extracted to the trained target model, which predicts the target type for each HTML DOM element. For example:
  for <input type="text" name="UserName"/> its target type is "UserNameTarget";
  for <input type="text" name="Password"/> its target type is "PasswordTarget";
  for <input type="submit" name="LoginButton"/> its target type is "LoginTarget";
5. As suggested by stage or step 209 in FIG. 2: the process takes an action or actions on each target element based on the generic rules defined in the knowledge base. For example:
  Set "<input type="text" name="UserName"/>" InnerText to Bob@bob.com;
  Set "<input type="text" name="Password">" innerText to "Bob1234";
  Invoke 'Click' on <input type="submit" name="LoginButton"/>;
6. As suggested by stage 210 in FIG. 2: after taking the action(s), the process evaluates if the end goal has been achieved. Since the end goal has not been achieved, the process will not exit here. As suggested by stage or step 210 and step 201 in FIG. 2: the action(s) taken in the previous step cause the web page to be navigated to UtilityA.com/Dashboard;
7. As suggested by stages or steps 202, 203, 204 and 205 in FIG. 2: the process extracts "features" from the page and provides them to the trained intent model; which, for example, predicts that the current page intent is "Dashboard";
8. As suggested by stage or step 206 in FIG. 2: after evaluating the page intents tracked so far, the process decides that the process is on the right track;
9. As suggested by stages or steps 207 and 208 in FIG. 2: the process provides the features extracted to the trained target model, which predicts each HTML DOM element's target type. For example:
  for <a href="/acctDetail">Property1 $100.00</a>, its target type is "AccountDetailTarget";
10. As suggested by stage or step 209 in FIG. 2: the process takes an action or actions on each target element based on the generic rules defined in the knowledge base or other data or information repository. For example:
  Extract account information from <a> element's innerText: "Property 1 $100.00"; and
11. As suggested by stage or step 210 in FIG. 2: after taking the action(s), the process evaluates if the end goal has been achieved. Since the end goal has been achieved, the process returns "Property 1 $100.00" as the current balance and exits.

Figure 4A:
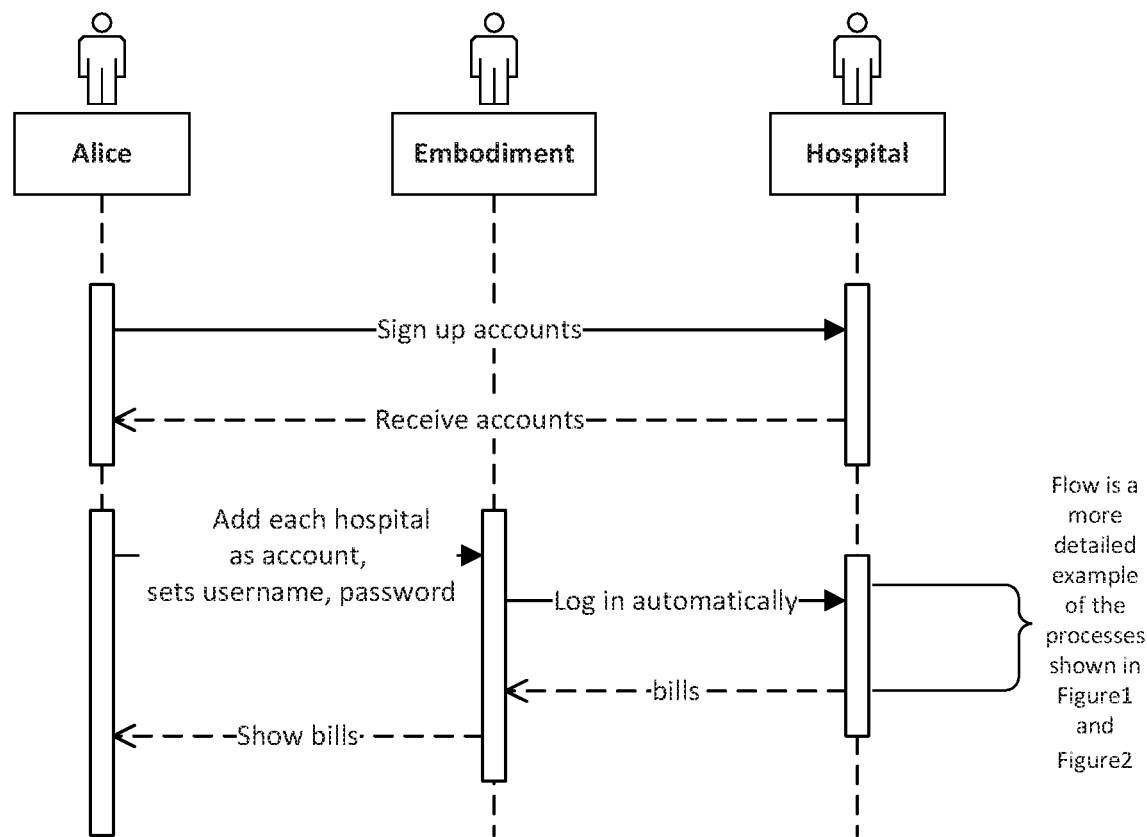
FIGS. 4(a) and 4(b) are diagrams illustrating a second example use case that involves an application of an embodiment of the automated data aggregation system and methods described herein, along with a flow diagram illustrating the steps or stages that may be implemented.
Figure 4B:
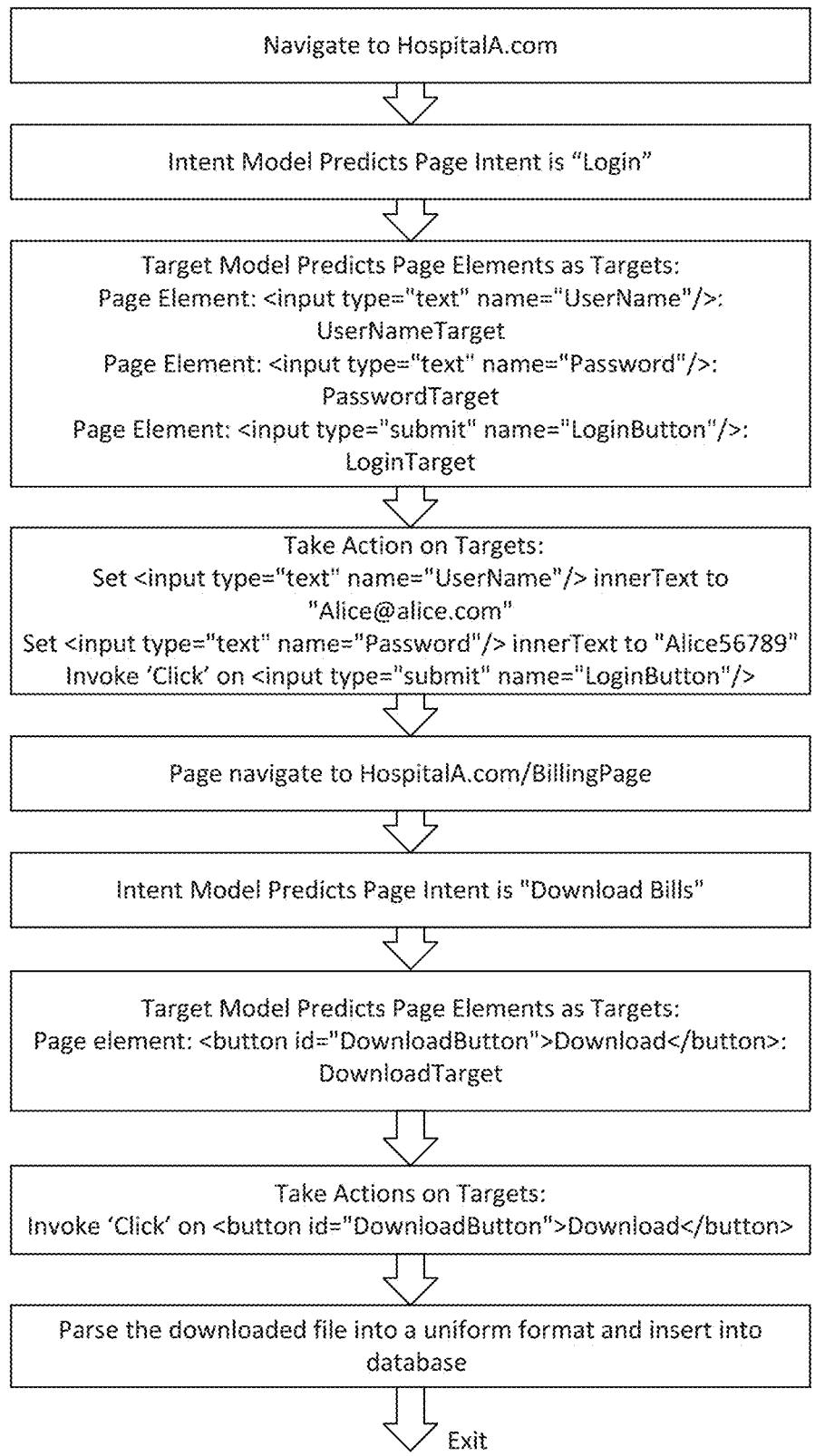

FIGS. 4(a) and 4(b) are diagrams illustrating a second example use case that involves an application of an embodiment of the automated data aggregation system and methods described herein, along with a flow diagram illustrating the steps or stages that may be implemented.

Example Use Case 2

Alice has accounts with multiple hospitals/labs. She wants to track all of her medical bills at one place automatically, so she can send them to her insurance company to file claims. Most of the hospitals/clinics offer no API and have their own unique website flow, making it overly expensive to write pre-programmed scripts to provide data aggregation services for such data;

Alice logs into the system or service platform that implements an embodiment of the data aggregation process or method described herein at the appropriate website and sets her username and password for each hospital. The system or service platform automatically retrieves Alice's bills from all her hospitals and labs. Alice can now see all her bills at one place. Alice can easily download all the bills and send them to her insurance company for claims.

FIG. 4(b) is a diagram illustrating a process or method for how the service platform may implement an embodiment that automatically retrieves Alice's billing information from HospitalA.com:

1: As suggested by stage or step 201 in FIG. 2: the process navigates to HospitalA.com;
2. As suggested by stages or steps 202, 203, 204 and 205 in FIG. 2: the process extracts "features" from the page and feeds them to the trained intent model, which for example, predicts that the current page intent is "Login";
3. As suggested by stages or steps 206 in FIG. 2: After evaluating the page intents tracked so far, the process decides that the process is on the right track.
4. As suggested by stages or steps 207 and 208 in FIG. 2: the process feeds the "features" extracted to the trained target model, which predicts each HTML DOM element's target type. For example:
  for <input type="text" name="UserName"/> its target type is "UserNameTarget";
  for <input type="text" name="Password"/> its target type is "PasswordTarget";
  for <input type="submit" name="LoginButton"/> its target type is "LoginTarget";
5. As suggested by stage or step 209 in FIG. 2: the process takes an action or actions on each target element based on the generic rules defined in the knowledge base or other respository. For example:
  Set "<input type="text" name="UserName"/>" InnerText to Alice@alice.com;
  Set "<input type="text" name="Password"/>" innerText to "Alice56789";
  Invoke 'Click' on <input type="submit" name="LoginButton"/>;
6. As suggested by stage 210 in FIG. 2: After taking the action(s), the process evaluates if the end goal has been achieved. Since the end goal has not been achieved, the process will not exit here. As suggested by stages or steps 210 and step 201 in FIG. 2: the actions taken in the previous step cause the web page to be navigated to HospitalA.com/BillingPage;
7. As suggested by stages or steps 202; 203, 204 and 205 in FIG. 2: the process extracts "features" from the page and feeds them to the trained intent model, which for example predicts that the current page intent is to "Download";

8. As suggested by stages or steps 206 in FIG. 2: after evaluating the page goals tracked so far, the process decides that the process is on the right track;

9. As suggested by stages or steps 207 and 208 in FIG. 2: the process feeds the features extracted to the trained target model, which predicts each HTML DOM element's target type. For example:
   for <button id="DownloadButton">Download</button> its target type is "DownloadTarget":

10, As suggested by stage or step 209 in FIG. 2: the process takes an action or actions on each target element based on the generic rules defined in the knowledge base or other repository. For example:
   Invoke 'Click' on <button id="DownloadButton">Download</button∞;
   the process parses the download file into a uniform format and stores the data in the database; and 11. As suggested by stage or step 210 in FIG. 2: after taking the actions, the process or method evaluates if the end goal has been achieved. Since the end goal has been achieved, the process exits.

Figure 5A:
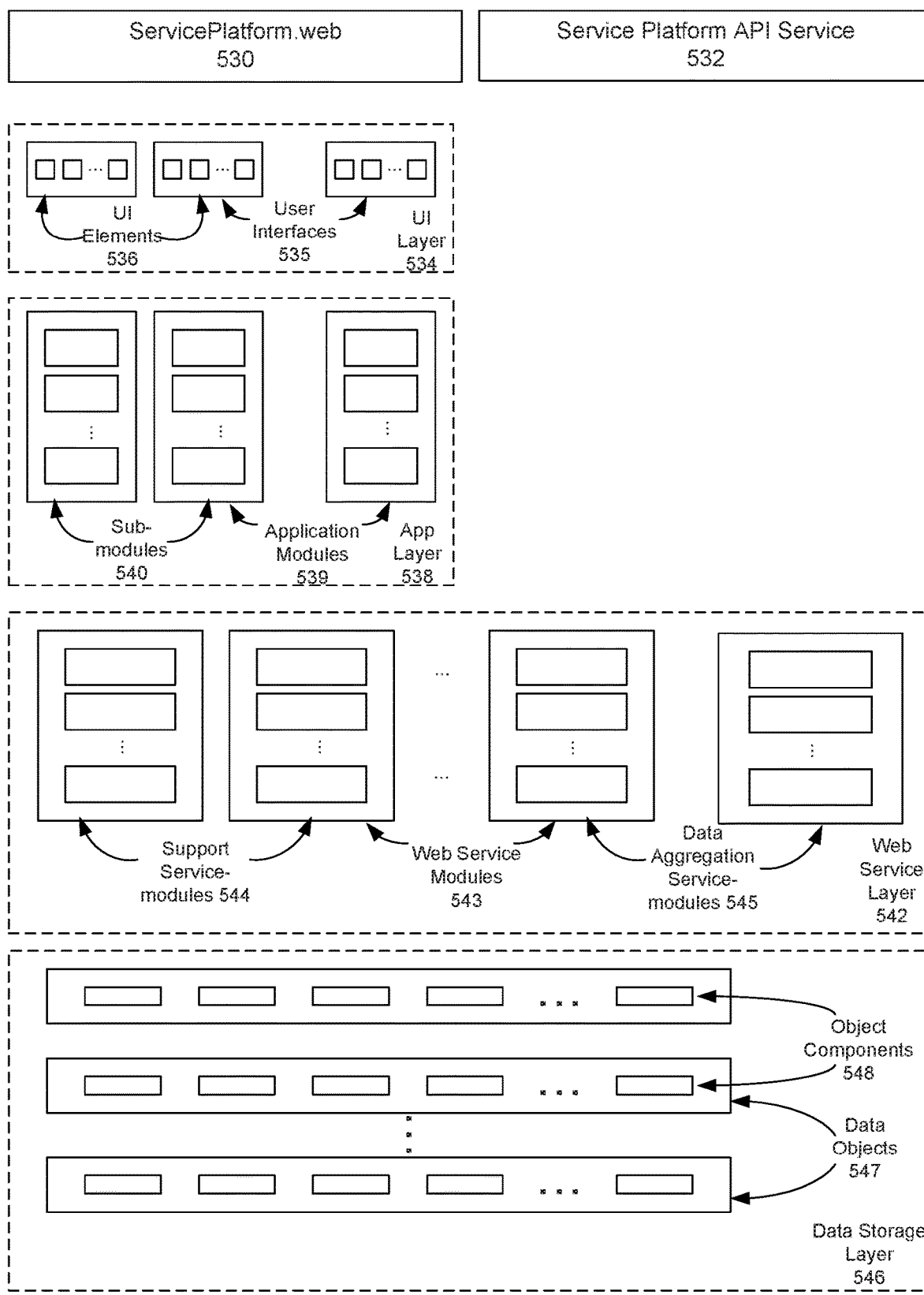
FIG. 5(a) is a diagram illustrating an example system architecture for a service platform that may be used in implementing an embodiment of the systems and methods described herein.
Figure 5B:
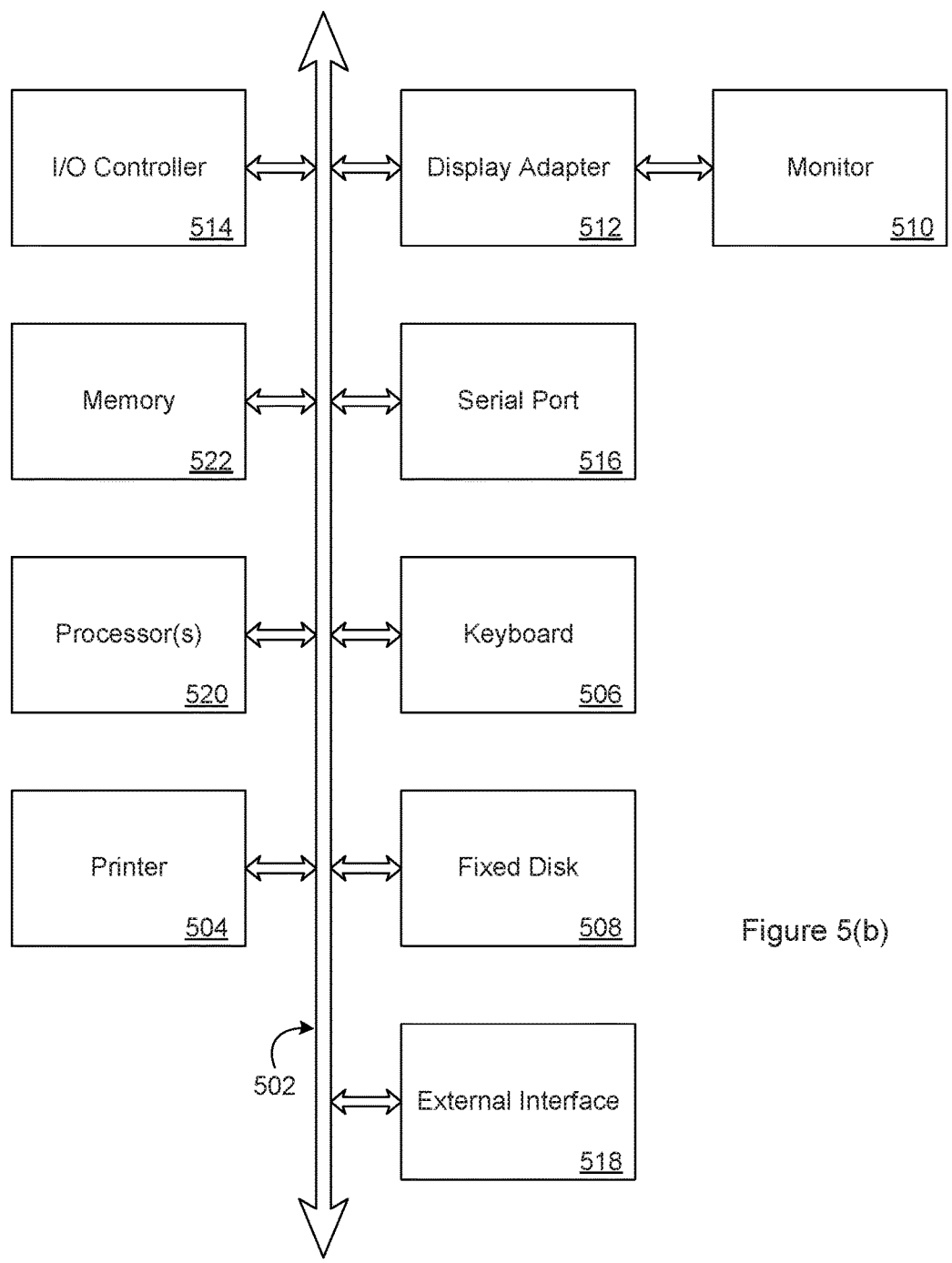
FIG. 5(b) is a diagram illustrating elements or components that may be present in a computing device or system configured to implement a method, process, function, or operation in accordance with one or more of the embodiments disclosed herein.

FIG. 5(*a*) is a diagram illustrating an example system architecture for a service platform that may be used in implementing an embodiment of the systems and methods described herein. In some embodiments, the service platform includes a website (ServicePlatform.web), an API (Restful web service), and other support services. The website operation typically implements a standard MVC (model-view-controller) architecture (note that FIGS. 6-8 and the accompanying description also describe aspects of this architecture or of a possible SaaS architecture for implementing one or more features of the embodiments described herein):

Models—model objects are the parts of the application that implement the logic for the application's data domain. Often, model objects retrieve and store model state in a database. For example, a Bill object might retrieve information from a database, operate on it, and then write updated information back to a Bills table in a SQL Server database;

Views—views are the components that display the application's user interface (UI). Typically, this UI is created from the model data. An example would be an edit view of a Bills table that displays text boxes, drop-down lists, and check boxes based on the current state of a Bill object;

Controllers—controllers are the components that handle user interaction, work with the model, and ultimately select a view to render that displays UI. In an MVC application, the view typically only displays information; the controller handles and responds to user input and interaction. For example, the controller handles query-string values, and passes these values to the model, which in turn might use these values to query the database. Controllers may utilize the web services layer implemented by the Service Platform, if available, to interact with the model indirectly.

In one embodiment, ServicePlatform.web (element, component, or process 530) is based on a standard MVC architecture, and its controller utilizes the API web service (element, component, or process 532) to interact with the model (data) indirectly. The API web service is composed of web service modules (element, component, or process 543) and one or more that execute an embodiment of the process(es) or functionality disclosed herein, that is a Data Aggregation service module (element, component, or process 545). When receiving a request, either directly from a service user or from the ServicePlatform.web Controller, the web service module (543) reads data from the model, launches or instantiates the Data Aggregation service module (545) to retrieve data, and saves that data to the model.

The API Service may be implemented in the form of a standard "Restful" web service, where RESTful web services are a way of providing interoperability between computer systems on the Internet. REST-compliant Web services allow requesting systems to access and manipulate textual representations of Web resources using a uniform and predefined set of stateless operations.

With reference to FIG. 5(*a*), as mentioned, the data aggregation service may be accessed or utilized via either a service platform website 530 or a service platform API 532. The service platform will include one or more processors or other data processing elements, typically implemented as part of a server. The service platform may be implemented as a set of layers or tiers, including a UI layer 534, an application layer 538, a web services layer 542, and a data storage layer 546. User Interface layer 534 may include one or more user interfaces 535, with each user interface composed of one or more user interface elements 536.

Application layer 538 is typically composed of one or more application modules 539, with each application module composed of one or more sub-modules 540. As described herein, each sub-module may represent executable software instructions or code that when executed by a programmed processor, implements a specific function or process. Web service layer 542 may be composed of one or more web service modules 543, again with each module including one or more sub-modules, with each sub-module representing executable instructions that when executed by a programmed processor, implement a specific function or process. For example, web service modules 543 may include modules or sub-modules used to provide support services (as suggested by support service-modules 544) and to provide the functionality associated with the data aggregation services and processes described herein (as suggested by data aggregation service-modules 545). Thus, in some embodiments, data aggregation service-modules 545 may include software instructions that when executed implement one or more of the functions described with reference to FIGS. 1-4. Data storage layer 546 may include one or more data objects 547, with each data object composed of one or more object components 548.

A user can invoke and access the functionality of an embodiment through either the website or the API. In this regard, FIG. 4(*a*) illustrates how a user interacts with the website directly to invoke an embodiment, while FIG. 3(*a*) illustrates how a user uses a third-party system that interacts with the Service Platform API service to invoke an embodiment. In both cases, when a user adds (for example) a utility account, it is identical to making an AddAccount request to the Service Platform. The Service Platform inserts the Account record into the database and launches the embodiment of the service/system. The service/system takes the Account information given by the user, for example account username and account password as inputs, and executes the stages or steps illustrated, for example, in FIG. 1 or FIG. 2 to retrieve the requested data. After the service/system retrieves the requested data, it stores the data in the database and exits. For the website access, after the requested data is available in the database, the UI interface presents the data stored in the database for a user to view. For access using the API web service, the third-party system on behalf of the user makes GetAccountInformation requests to the API service to retrieve the stored data from the database.

Note that the system, elements, functions, operations, methods, and processes described herein may be used for purposes other than data aggregation—for example, the machine learning and natural language processing described may be used to not only collect data, but also to complete data entry work automatically, such as filing taxes and completing claim forms. For example, an embodiment may navigate to an insurance company's website for electronically filing claims. Similar to the process illustrated in FIG. 2, the process will log into the user's account with given login credentials and navigate to the claims page. During the process the embodiment feeds features extracted from the web page to the trained models to make real-time predictions of which target elements to act upon and what actions to take. However, instead of extracting information or downloading data as illustrated in FIG. 3(b) or FIG. 4(b), the process enters the information given by the user to the target elements and submits the information to the insurance company. In this way the process can automate tedious data entry tasks for the end user. Such an approach has similar advantages as discussed earlier: it requires no API support from the sources; it requires no prior knowledge of the website and therefore reduces cost significantly; and, it can adjust to source's website changes automatically and improve the service reliability.

The architecture of FIG. 5(a) is an example of a multi-tenant architecture which may be used to provide user access to various data stores and executable applications or functionality (sometimes referred to as providing Software-as-a-Service (SaaS)). Although FIG. 5(a) and its accompanying description are focused on a service platform for providing the functionality associated with the data aggregation process described with reference to FIGS. 1 and 2, note that a more generalized form of a multi-tenant platform may be used that includes the capability to provide other services or functionality. For example, the service provider may also provide a user with the ability to conduct certain data analysis, billing, account maintenance, etc.

For example, a service platform may be able to provide deeper data analysis by taking advantage of data access across domains. For instance, by having medical bills, and insurance bills in one place over a period of time, users may be able to identify ways to optimize his or her health insurance plan based on the past medical spending. Another example service that might be provided is to enable a user to have a transaction history from all of their bank and credit card accounts in one place; the user can then leverage a service platform's data analysis tools to identify where most spending takes place and the best way to save money.

Other data analysis tools can be implemented on the service platform (or may be accessible by it) to automate data-based tasks, such as reminding a user of due dates, automatically paying bills, notifying a user of a low account balance, etc. The service platform offers users additional flexibility in terms of data sharing as well. For example, if a small business owner applies for a loan, instead of sending lengthy bank statements, tax filings and other documents, he or she can grant access to specific data stores or functionality of a service platform account to the loan office. This will enable a loan officer to access data regarding a bank account, credit card activity, utility bills, or even tax filings in one place.

Further, a user may be able to set an access restriction or remove an access restriction for a specific data set, data store, or entity, either separately or collectively. Thus, in some embodiments, the system and methods described herein enable a user to group or link together data from multiple accounts/sources and then to grant or revoke access to that set of data based on the identify of an entity (e.g., insurance agent, loan officer, or investment counselor), the source of the data (e.g., only granting access to certain of the aggregated data), the age of the data, etc.

Figure 6:
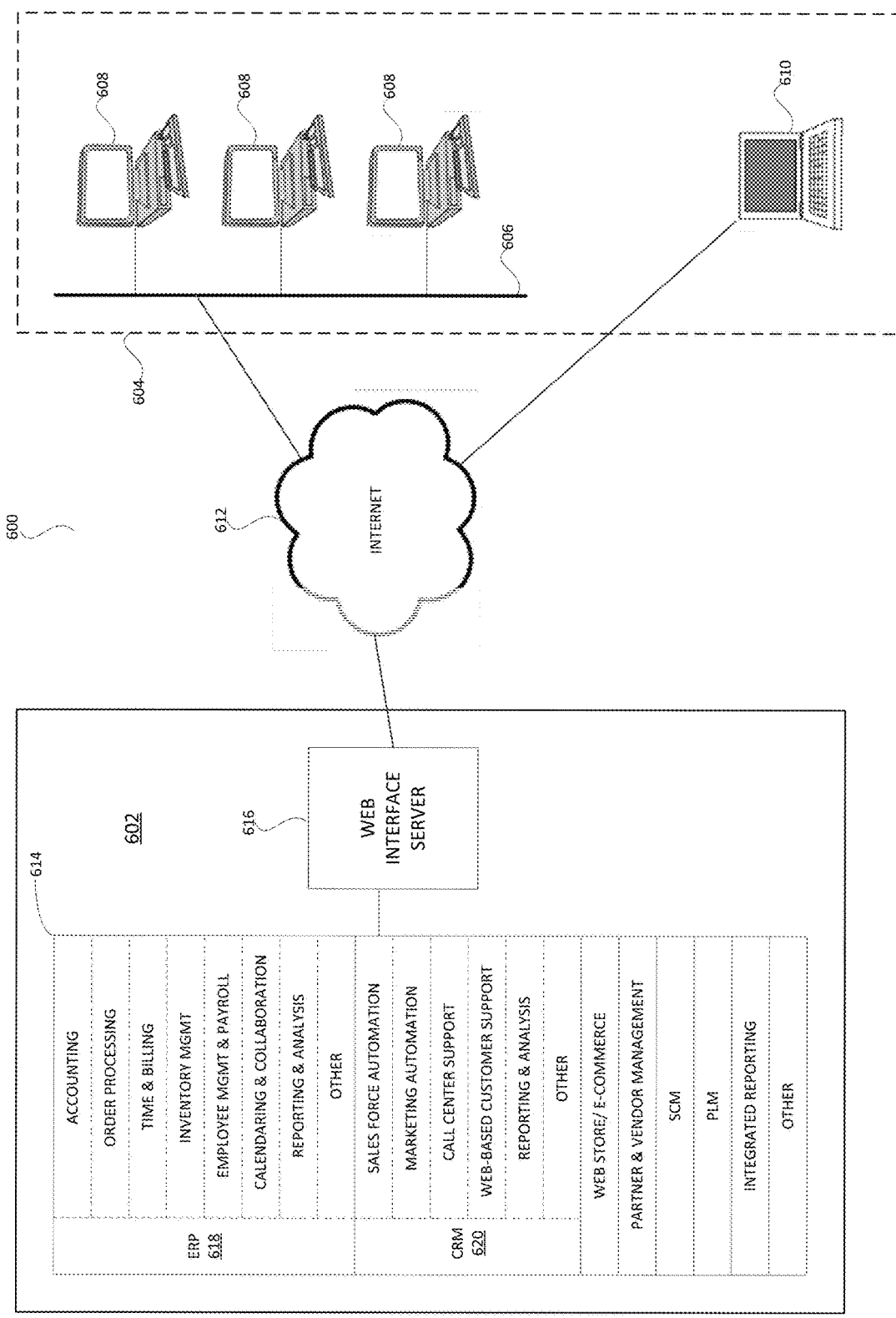
FIGS. 6-8 are diagrams illustrating aspects of a multi-tenant platform architecture that may be used, in whole or in part, in implementing an embodiment of the systems and methods described herein.
Figure 7:
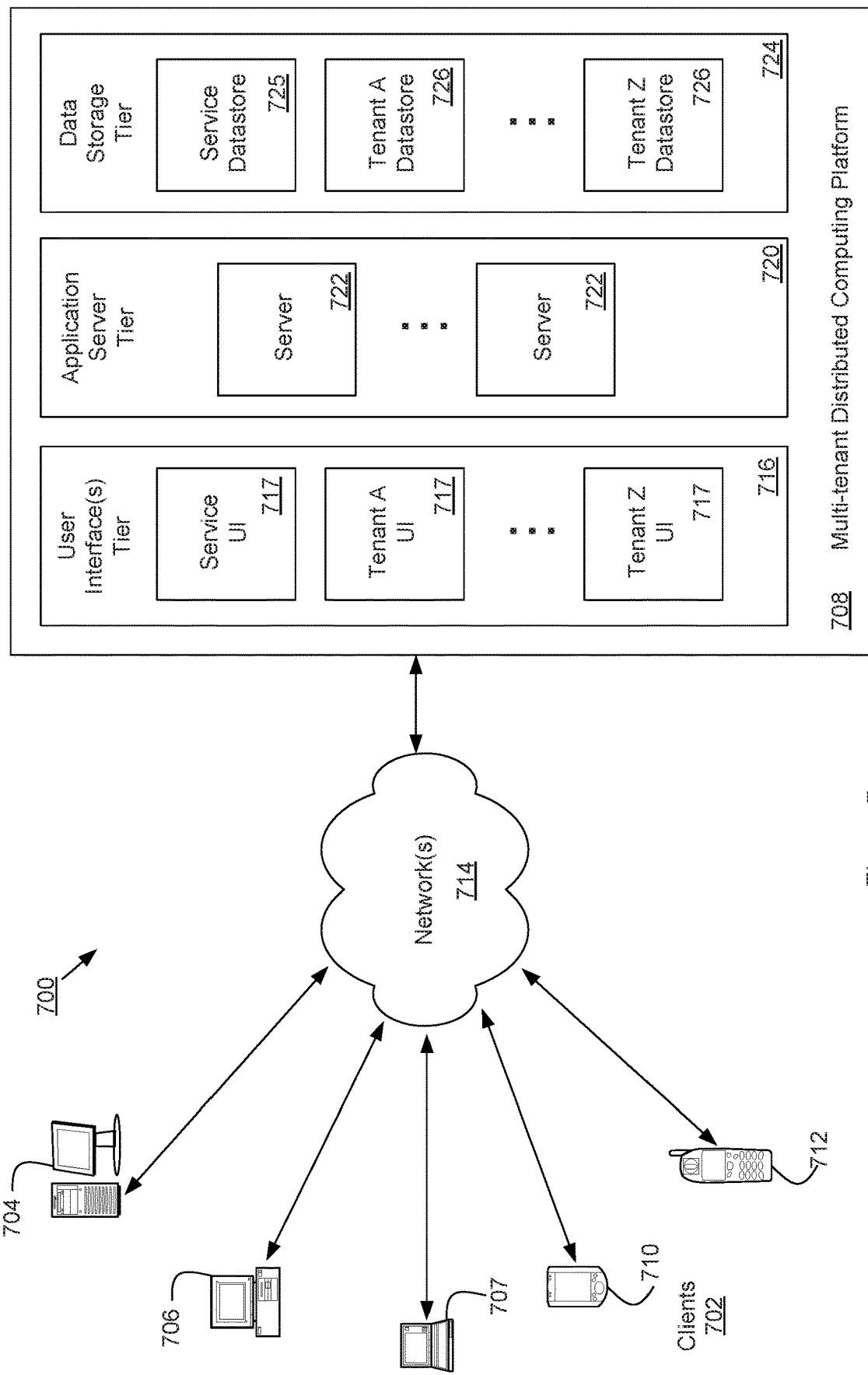
Figure 8:
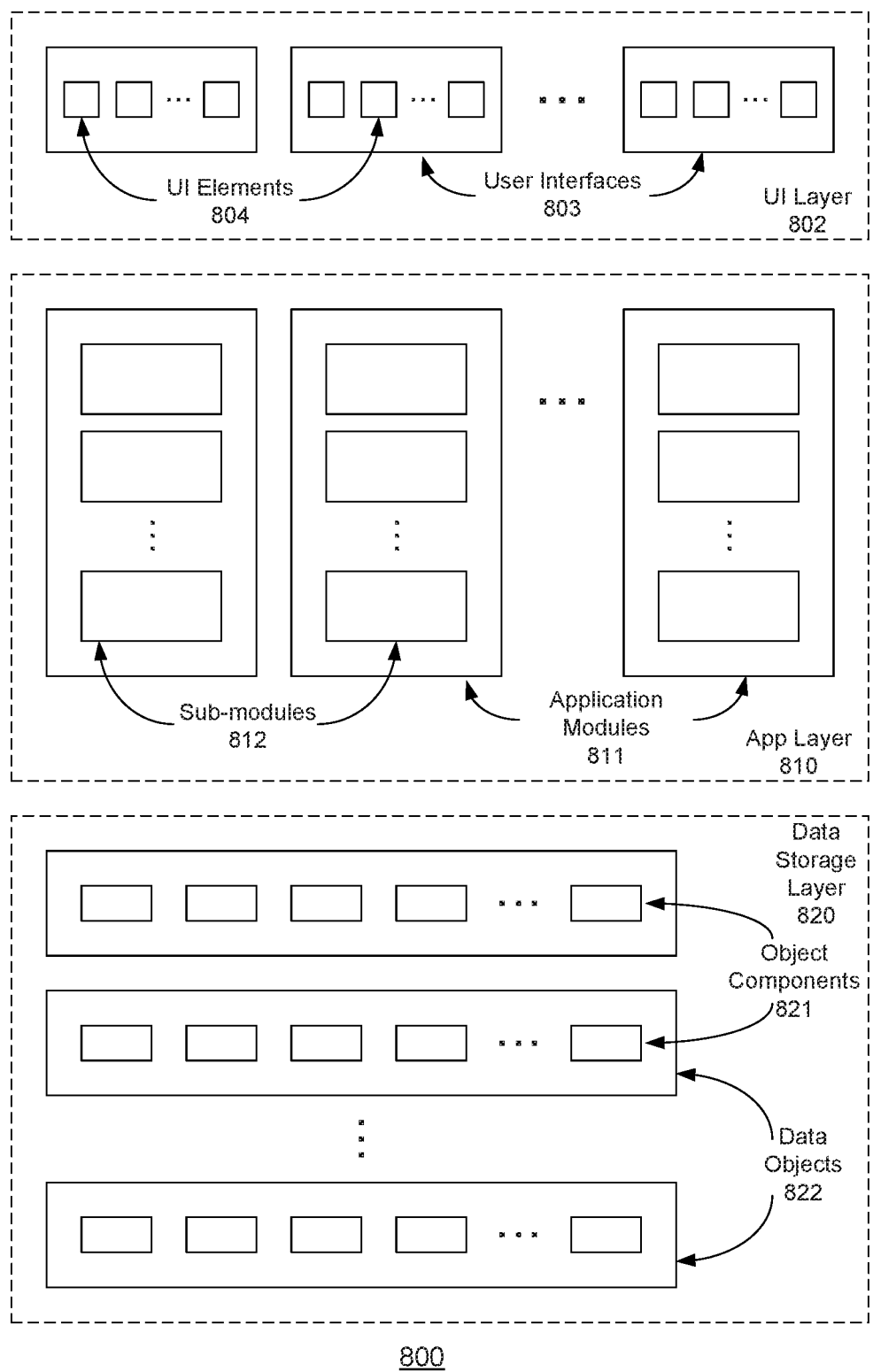

FIGS. 6-8 are diagrams illustrating aspects of a multi-tenant platform architecture that may be used, in whole or in part, in implementing an embodiment of the systems and methods described herein. Further information and details regarding the elements, processes and operation of the platform architecture illustrated in those figures is described below. Note that this information may assist in understanding certain of the implementation details in establishing and operating a data aggregation service platform of the type described herein (such as that described with reference to FIG. 5(a), which has some similarities to FIG. 8).

FIG. 6 is a diagram illustrating a system 600, including an integrated business system 602 and an enterprise network 604. Enterprise network 604 may be associated with a business enterprise, such as a retailer, merchant, service provider, or other type of business. Alternatively, and in accordance with the advantages of an application service provider (ASP) hosted integrated business system (such as a multi-tenant data processing platform), the business enterprise may comprise fewer or no dedicated facilities or business network at all, provided that its end users have access to an internet browser and an internet connection. For simplicity and clarity of explanation, the enterprise network 604 is represented by an on-site local area network 606 to which a plurality of personal computers 608 are connected, each generally dedicated to a particular end user (although such dedication is not required), along with an exemplary remote user computer 610 that can be, for example, a laptop computer or tablet computer of a traveling employee having internet access through a hotel, coffee shop, a public Wi-Fi access point, or other internet access method. The end users associated with computers 608 and 610 may also (or instead) possess an internet-enabled smartphone or other electronic device (such as a PDA) having wireless internet access or other synchronization capabilities. Users of the enterprise network 604 interface with the integrated business system 602 across the Internet 612 or another suitable communications network or combination of networks.

Integrated business system 602, which may be hosted by a dedicated third party, may include an integrated business server 614 and a web interface server 616, coupled as shown in FIG. 6, It is to be appreciated that either or both of the integrated business server 614 and the web interface server 616 may be implemented on one or more different hardware systems and components, even though represented as singular units in FIG. 6. In one embodiment, integrated business server 614 comprises an ERP module 618 and further comprises a CRM module 620. In many cases, it will be desirable for the ERP module 618 to share methods, libraries, databases, subroutines, variables, etc., with CRM module 620, and indeed ERP module 618 may be intertwined with CRM module 620 into an integrated Business Data Processing Platform (which may be single tenant but is typically multi-tenant).

The ERP module 618 may include, but is not limited to, a finance and accounting module, an order processing module, a time and billing module, an inventory management and distribution module, an employee management and payroll module, a calendaring and collaboration module, a reporting and analysis module, and other ERP-related modules. The CRM module 620 may include, but is not limited to, a sales force automation (SFA) module, a marketing automation module, a contact list module (not shown), a call center support module, a web-based customer support module, a reporting and analysis module, and other CRM-related modules. The integrated business server 614 (or multi-tenant data processing platform) may also (or instead) provide other business functionalities. Web interface server 616 is configured and adapted to interface with the integrated business server 614 to provide one or more web-based user interfaces to end users of the enterprise network 604.

The integrated business system shown in FIG. 6 may be hosted on a distributed computing system made up of at least one, but likely multiple, "servers," A server is a physical computer dedicated to run one or more software services intended to serve the needs of the users of other computers that are in data communication with the server, for instance via a public network such as the Internet or a private "intranet" network. The server, and the services it provides, may be referred to as the "host" and the remote computers, and the software applications running on the remote computers, being served may be referred to as "clients." Depending on the computing service that a server offers it could be referred to as a database server, file server, mail server, print server, web server, etc. A web server is a most often a combination of hardware and the software that helps deliver content, commonly by hosting a website, to client web browsers that access the web server via the Internet, FIG. 7 is a diagram illustrating elements or components of an example operating environment 700 in which an embodiment of the systems and methods described herein may be implemented. As shown, a variety of clients 702 incorporating and/or incorporated into a variety of computing devices may communicate with a distributed computing service/platform 708 through one or more networks 714. For example, a client may incorporate and/or be incorporated into a client application (e.g., software) implemented at least in part by one or more of the computing devices. Examples of suitable computing devices include personal computers, server computers 704, desktop computers 706, laptop computers 707, notebook computers, tablet computers or personal digital assistants (PDAs) 710, smart phones 712, cell phones, and consumer electronic devices incorporating one or more computing device components, such as one or more electronic processors, microprocessors, central processing units (CPU), or controllers. Examples of suitable networks 714 include networks utilizing wired and/or wireless communication technologies and networks operating in accordance with any suitable networking and/or communication protocol (e.g., the Internet).

The distributed computing service/platform (which may also be referred to as a multi-tenant business data processing platform) 708 may include multiple processing tiers or layers, including a user interface tier 716, an application server tier 720, and a data storage tier 724. The user interface tier 716 may maintain multiple user interfaces 717, including graphical user interfaces and/or web-based interfaces. The user interfaces may include a default user interface for the service to provide access to applications and data for a user or "tenant" of the service (depicted as "Service UI" in the figure), as well as one or more user interfaces that have been specialized/customized in accordance with user specific requirements (e.g., represented by "Tenant A UI", . . . , "Tenant Z UI" in the figure, and which may be accessed via one or more APIs), The default user interface may include components enabling a tenant to administer the tenant's participation in the functions and capabilities provided by the service platform, such as accessing data, causing the execution of specific data processing operations, etc. Each processing tier shown in the figure may be implemented with a set of computers and/or computer components including computer servers and processors, and may perform various functions, methods, processes, or operations as determined by the execution of a software application or set of instructions. The data storage tier 724 may include one or more data stores, which may include a Service Data store 725 and one or more Tenant Data stores 726.

Each tenant data store 726 may contain tenant-specific data that is used as part of providing a range of tenant-specific business services or functions, including but not limited to data related to ERP, CRM, eCommerce, Human Resources management, payroll, etc. Data stores may be implemented with any suitable data storage technology, including structured query language (SQL) based relational database management systems (RDBMS).

Distributed computing service/platform 708 may be multi-tenant, and service platform 708 may be operated by an entity (such as a service provider) in order to provide multiple tenants with one or more of a set of business related applications, data processing capabilities, data storage, or other functionality (such as the data aggregation services described herein). These applications and functionality may include ones that a business uses to manage various aspects of its operations. For example, the applications and functionality may include providing web-based access to business information systems, thereby allowing a user with a browser and an Internet or intranet connection to view, enter, process, or modify certain types of business information.

As noted, such business information systems may include an Enterprise Resource Planning (ERP) system that integrates the capabilities of several historically separate business computing systems into a common system, with the intention of streamlining business processes and increasing efficiencies on a business-wide level. Such functions or business applications are typically implemented by one or more modules of software code/instructions that are maintained on and executed by one or more servers 722 that are part of the platform's Application Server Tier 720.

Another business information system that may be provided as part of an integrated data processing and service platform is an integrated Customer Relationship Management (CRM) system, which is designed to assist in obtaining a better understanding of customers, enhance service to existing customers, and assist in acquiring new and profitable customers. Such functions or business applications are typically implemented by one or more modules of software code/instructions that are maintained on and executed by one or more servers 722 that are part of the platform's Application Server Tier 720.

As noted with regards to FIG. 6, the integrated business system shown in FIG. 7 may be hosted on a distributed computing system made up of at least one, but typically multiple, "servers." A server is a physical computer dedicated to run one or more software services intended to serve the needs of the users of other computers in data communication with the server, for instance via a public network such as the Internet or a private "intranet" network. The server, and the services it provides, may be referred to as the "host" and the remote computers and the software applications running on the remote computers may be referred to as the "clients."

Rather than build and maintain such an integrated business system themselves, a business may utilize systems provided by a third party. Such a third party may implement an integrated business system/platform as described herein in the context of a multi-tenant platform, wherein individual instantiations of a single comprehensive integrated business system are provided to a variety of tenants. One advantage to such multi-tenant platforms is the ability for each tenant to customize their instantiation of the integrated business system to that tenant's specific business needs or operational methods. Each tenant may be a business or entity that uses the multi-tenant platform to provide business data and functionality to multiple users.

FIG. 8 is a diagram illustrating additional details of the elements or components of the multi-tenant distributed computing service platform of FIG. 7. In general, an embodiment of the invention may be implemented using a set of software instructions that are designed to be executed by a suitably programmed processing element (such as a CPU, Graphics Processing Unit (GPU), microprocessor, processor, controller, computing device, etc.). In a complex system such instructions are typically arranged into "modules" with each such module performing a specific task, process, function, or operation. The entire set of modules may be controlled or coordinated in their operation by an operating system (OS) or other form of organizational platform.

With reference to FIG. 8, the example architecture 800 includes a user interface layer or tier 802 having one or more user interfaces 803. Examples of such user interfaces include graphical user interfaces and application programming interfaces (APIs). Each user interface may include one or more interface elements 804. For example, users may interact with interface elements in order to access functionality and/or data provided by application and/or data storage layers of the example architecture. Examples of graphical user interface elements include buttons, menus, checkboxes, drop-down lists, scrollbars, sliders, spinners, text boxes, icons, labels, progress bars, status bars, toolbars, windows, hyperlinks and dialog boxes. Application programming interfaces may be local or remote and may include interface elements such as parameterized procedure calls, programmatic objects and messaging protocols.

The application layer 810 may include one or more application modules 811, each having one or more sub-modules 812. Each application module 811 or sub-module 812 may correspond to a particular function, method, process, or operation that is implemented by the module or sub-module (e.g., a function or process related to providing ERP, CRM, eCommerce or other functionality to a user of the platform). Such function, method, process, or operation may also (or instead) include those used to implement one or more aspects of the inventive system and methods, such as for performing a data aggregation process by (note that these functions or processes are also examples of those that may be implemented by one or more of the data aggregation service-modules 545 of FIG. 5(a)):

Navigating to a website
  Navigate function input: URL, output: browser object;
  Extracting relevant "features" from a webpage to predict page intent;
    ExtractFeatures function: input: browser object, output: features object(s); ExtractFeature invokes other functions within itself:
      ExtractImageFeatures function: input browser object, output [n, m, 3] matrix, n and m are the numbers of pixels of image width and height of the current page, 3 represents the RGB values of each pixel.
      ExtractTextFeatures function: browser's HTML DOM object, output [e, w] matrix, e is the number of HTML DOM elements in the current page, w is the total number of features extracted for each DOM element. For example, each element's raw innerText, as well as texts from attributes such as id, name, title, etc., may be stemmed, tokenized, and then transformed into a [1, w] array. w is the size of the total vocabulary. Alternatively, augmentation can be done on top of the tokenized word to incorporate semantic information pre-trained from large annotated text corpora. For example, with pre-trained word embedding each word can be converted to a small dimension vector instead.

Figure 9B:
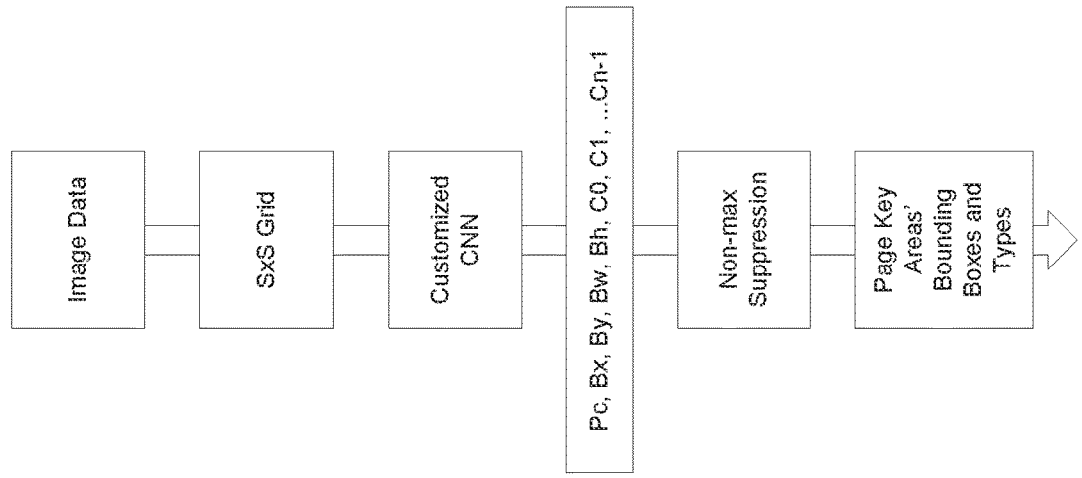
FIG. 9 is a diagram illustrating the architecture (FIG. 9(a)) and operation or processing flow (FIG. 9(b)) of a convolutional neural network that may be used as part of the processing of a page in an implementation of the system and methods for automated data aggregation described herein.
Figure 9A:
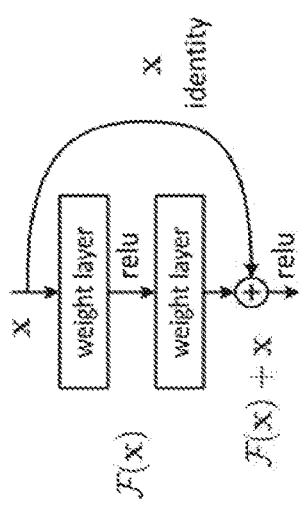
Figure 9:
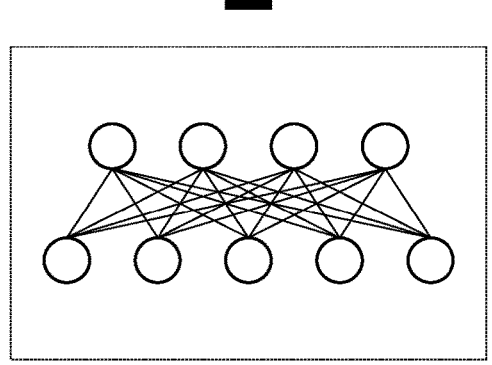
Figure 10:
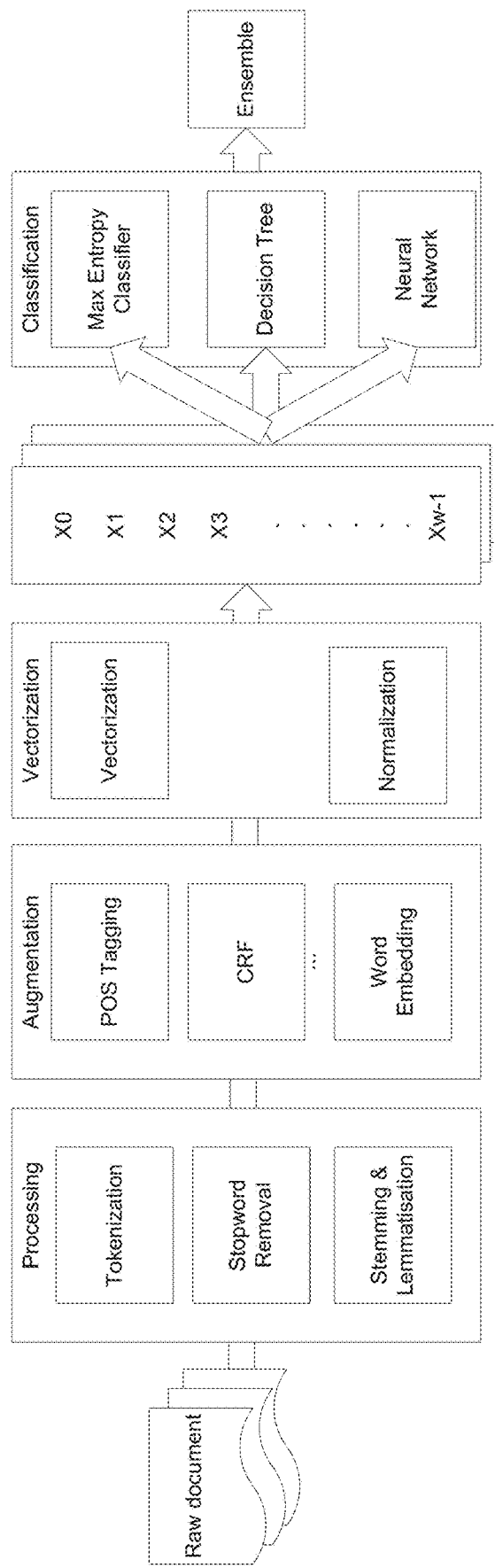
FIG. 10 is a diagram illustrating a Natural Language Processing (NLP) model that may be used as part of the processing of a page in an implementation of the system and methods for automated data aggregation described herein.

Providing the extracted features to a suitably trained intent model;
  PredictIntent function, input: features object(s), output: intent object. Intent object is in the form of [1, c], c is the number of intent types. Each element represents the probability of how likely the current page is of the corresponding intent type. The PredictIntent function can be broken down into several parts:
    Part 1: send the extracted image feature to a convolutional neural network (CNN) to classify. A convolutional neural network is a sequence of layers, and every layer of the network transforms one volume of activations to another through a differentiable function. The convolutional neural network transforms the original image layer by layer from the original pixel values to the final array of probability for corresponding intent type. One example, as shown in FIG. 9, (which is a diagram illustrating the architecture (FIG. 9(a)) of a neural network that may be used as part of the processing of a page in an implementation of the system and methods for automated data aggregation described herein) is to use a customized deep residual network with 50 layers, each layer using ReLU as activation function, with identity shortcut connections added;
    Part 2: send the extracted image feature to an object detection and segmentation system to identify key areas of the image. As shown in FIG. 9(b), the object detection and segmentation system may convert the image into a grid, or utilize a sliding window, and utilize a convolutional neural network (CNN) to classify each area of the image into anchor boxes with class type and confidence. The system then uses non-max suppression to predict the final objects and their corresponding class types in the current page. The objects are key areas in the current web page, such as navigation bar, side menu, grid, footer, etc.;
    Part 3: The key areas' information is then sent to the NLP model. As shown in FIG. 10 (which is a diagram illustrating a Natural Language Processing (NLP) model that may be used as part of the processing of a page in an implementation of the system and methods for automated data aggregation described herein), extracted text features for all of the elements in the key area are combined for an NLP model to predict an intent type for each key area. As shown in FIG. 10:
      Step 1: Combine text features of all elements in the key area into a raw document. If there are n key areas, there will be n raw documents;
      Step 2: Process the raw documents. Remove stop-words such as "the", "into" from the raw document. "Tokenize" the raw document into an array of tokens. Use "Stemming" or "Lemmatisation" to remove morphological affixes from tokens, leaving only the word stem, for example, "accounts" becomes "account". For example, a raw document with text "log into your accounts" can be converted into ["log", "your", "account"]

Step 3: After processing the raw documents into token arrays, each token within the array can be further augmented by invoking sub models such as POS tagging (part-of-speech tagging), word embedding, conditional random fields (CRF) or Latent dirichlet allocation (LDA). For example, with part-of-speech tagging, the ["log", "your", "account"] array can be augmented into [["log", "verb"], ["your", "possessive adjective"], ["account", "noun"]]

Step 4: Vectorize token arrays into vectors. A vectorizer such as count vectorizer will convert each document's vector array into a 1×m array, m being the size of the total vocabulary across documents while each element represents the number of occurrence of the token. The vectors can be normalized by algorithms such as Term Frequency-Inverse Document Frequency(tf-idf) that giving tokens that occur in most documents a lower weight.

Step 5: The vectorized documents data are fed to the NLP model. The NLP model may include one or more different classifiers such as Max entropy, Decision Tree; Neural Network, Support Vector Machine (SVM), etc. The prediction results from different classifiers may be ensembled using a suitable one of the ensemble methods such as Bagging methods, Random Forest, AdaBoost, Gradient Tree Boosting, Stacking, or Voting Classifier. The array of intent type and corresponding probability for the key areas may then be combined into a vector to be further classified, using classifiers such as Max entropy, Decision Tree, or Neural Network into an intent type for the whole page; and Part 4: Prediction results from both a visual model and NLP model are ensembled using one of the ensemble methods such as Bagging methods, Random Forest, AdaBoost, Gradient Tree Boosting, Stacking, or Voting Classifier.

Extracting relevant "features" from a HTML DOM element to predict its target type;
ExtractFeatures function: input: HTML DOM element object, output feature object(s);
ExtractFeatures (in some embodiments) invokes other functions within itself:
  ExtractImageFeatures function: input image of the element, output [n', m', 3] matrix, n' and m' are the numbers of pixels of image width and height of the element, 3 represents the RGB values of each pixel.
  ExtractTextFeatures function: input: HTML DOM element, output [1, w'] array. For example, the HTML element's innerText, as well as texts from attributes such as id, name, title, etc., may be stemmed, tokenized, and then transformed into a [1, w'] array. w' is the size of the vocabulary.
Using the trained target model to "predict" the target type of a given HTML DOM element;

PredictTarget function, input: feature objects of the element, output: target type object. Target object is in the form of [1, c'], where c' is the number of target types. Each element within the array represents the probability of how likely the HTML element is to be of the corresponding target type. PredictTarget function can be broken down into several parts:
  Part 1: send the extracted image feature to a convolutional neural network (CNN) to classify the image or one or more objects in the image. A convolutional neural network is a sequence of layers, and every layer of the network transforms one volume of activations to another through a differentiable function. The convolutional neural network transforms the original image layer-by-layer from the original pixel values to the final array of the probability for a corresponding target type;
  Part 2: the extracted text features for the HTML element are sent to the NLP model. During prediction, feature set can be further augmented by invoking sub models such as POS tagging (part-of-speech tagging), word embedding and Conditional Random Fields (CRF). The NLP model may include one or more different classifiers such as Max entropy, Decision Tree, Support Vector Machine, etc. The prediction results from different classifiers may be ensembled using one of the ensemble methods such as Bagging methods, Random Forest, AdaBoost, Gradient Tree Boosting, Stacking, or Voting Classifier (as suggested by FIG. 10); and
  Part 3: Prediction results from both visual model and NLP model are ensembled using one of the ensemble methods such as Bagging methods, Random Forest, AdaBoost, Gradient Tree Boosting, Stacking, or Voting Classifier.
Executing a suitable action
  TakeAction function, input: target element object(s). The actions for target elements are typically predefined and generic across websites. For example, a target element with tagname "input" and type "text" is identified as a textbox. If the target type is "UserNameTarget" then the action for this textbox's is to set its innerText to the given username. The TakeAction function goes through all of the target elements in the current page, selects the element with the greatest probability for each target type, and invokes the corresponding action on the element. The history of actions taken on each element is recorded. The elements not selected for each target type are also tracked, in case the action proves incorrect, and the element with the next highest probability may be acted upon when the navigation is restored back to the current page.

The application modules and/or sub-modules may include any suitable computer-executable code or set of instructions (e.g., as would be executed by a suitably programmed processor, microprocessor, or CPU), such as computer-executable code corresponding to a programming language. For example, programming language source code may be compiled into computer-executable code. Alternatively, or in addition, the programming language may be an interpreted programming language such as a scripting language. Each application server (e.g., as represented by element 722 of FIG. 7) may include each application module. Alternatively, different application servers may include different sets of application modules. Such sets may be disjoint or overlapping.

The data storage layer 820 may include one or more data objects 822 each having one or more data object components 821, such as attributes and/or behaviors. For example, the data objects may correspond to tables of a relational database, and the data object components may correspond to columns or fields of such tables, Alternatively, or in addition, the data objects may correspond to data records having fields and associated services. Alternatively, or in addition, the data objects may correspond to persistent instances of programmatic data objects, such as structures and classes. Each data store in the data storage layer may include each data object. Alternatively, different data stores may include different sets of data objects. Such sets may be disjoint or overlapping.

Note that the example computing environments depicted in FIGS. 6-8 are not intended to be limiting examples. Alternatively, or in addition, computing environments in which an embodiment of the invention may be implemented (in whole or in part) include any suitable system platform that permits users to access data stored in other systems, where those systems may be accessed remotely over a network. Further example environments in which an embodiment or a portion of an embodiment disclosed herein may be implemented include devices (including mobile devices), software applications, systems, apparatuses, networks, or other configurable components that may be used by multiple users for data access, data entry, data processing, application execution, data review, etc. Note that an embodiment may in some circumstances be implemented in the form of an application, a sub-routine that is part of a larger application, a "plug-in", an extension to the functionality of a data processing system or platform, or any other suitable form.

FIG. 5(*b*) is a diagram illustrating elements or components that may be present in a computing device or system configured to implement a method, process, function, or operation in accordance with one or more of the embodiments disclosed herein. As noted, in some embodiments, the system and methods may be implemented in the form of an apparatus that includes a processing element and set of executable instructions. The executable instructions may be part of a software application and arranged into a software architecture. In general, an embodiment may be implemented using a set of software instructions that are designed to be executed by a suitably programmed processing element (such as a CPU, GPU (graphics processing unit), microprocessor, processor, controller, computing device, etc.). In a complex application or system such instructions are typically arranged into "modules" with each such module typically performing a specific task, process, function, or operation. The entire set of modules may be controlled or coordinated in their operation by an operating system (OS) or other form of organizational platform. With regards to the embodiments disclosed herein; each module or sub-module may include software instructions that, when executed, implement a step or stage (or a collection of steps or stages) used in providing the data aggregation services described.

Each Data Aggregation service module or sub-module may correspond to a particular function, method, process, or operation that is implemented by the module or sub-module (e.g., a function or process related to the operations or functionality of the service platform). As described with reference to FIGS. 5(*a*) and 8, such function, method, process, or operation may include those used to implement one or more aspects of an embodiment of the system, service, or methods described herein, such as for (note that these are referring to the processes, operations, or functions described with reference to application module 811 or sub-module 812, and/or service module 545, and their equivalents):

Navigating to a website;
Extracting relevant "features" from a webpage to predict page "intent";
Providing the extracted features to a suitably trained intent model;
Extracting relevant "features" from a HTML DOM element to predict its target type;
Using the trained target model to "predict" the target type of a given HTML DOM element; and
Executing a suitable action.

As noted, in some embodiments, the history of actions taken on each element may be recorded. The elements not selected for each target type are also tracked, in case the action proves incorrect, and the element with the next highest probability may be acted upon when the navigation is restored back to the current page.

The Data Aggregation service module(s) and/or or sub-module(s) may include any suitable computer-executable code or set of instructions (e.g., as would be executed by a suitably programmed processor, microprocessor, CPU, or GPU), such as computer-executable code corresponding to a programming language. For example, programming language source code may be compiled into computer-executable code. Alternatively, or in addition, the programming language may be an interpreted programming language such as a scripting language. The computer-executable code or set of instructions may be stored in (or on) any suitable non-transitory computer-readable medium. In general, with regards to the embodiments described herein, a non-transitory computer-readable medium may include almost any structure, technology or method apart from a transitory waveform or similar medium.

As described, the system, apparatus, methods, processes, functions, and/or operations for implementing an embodiment may be wholly or partially implemented in the form of a set of instructions executed by one or more programmed computer processors such as a central processing unit (CPU) or microprocessor. Such processors may be incorporated in an apparatus, server, client or other computing or data processing device operated by, or in communication with, other components of the system. As an example, FIG. 5(*b*) is a diagram illustrating elements or components that may be present in a computer device or system 500 configured to implement a method, process, function, or operation in accordance with one or more of the embodiments disclosed herein.

The subsystems shown in FIG. 5(*b*) are interconnected via a system bus 502. Additional subsystems include a printer 504, a keyboard 506, a fixed disk 508, and a monitor 510, which is coupled to a display adapter 512. Peripherals and input/output (I/O) devices, which couple to an I/O controller 514, can be connected to the computer system by any number of means known in the art, such as a serial port 516. For example, the serial port 516 or an external interface 518 can be utilized to connect the computer device 500 to further devices and/or systems not shown in FIG. 5 including a wide area network such as the Internet, a mouse input device, and/or a scanner. The interconnection via the system bus 502 allows one or more processors 520 to communicate with each subsystem and to control the execution of instructions that may be stored in a system memory 522 and/or the fixed disk 508, as well as the exchange of information between subsystems. The system memory 522 and/or the fixed disk 508 may embody a tangible computer-readable medium.

In some embodiments, the methods or models described herein (such as those referred to with regards to FIG. 1, 2, 3(b) or 4(b)) may be embodied in the form of a trained neural network, where the network is implemented by the execution of a set of computer-executable instructions. The instructions may be stored in (or on) a non-transitory computer-readable medium and executed by a programmed processor or processing element. The specific form of the method or model may be used to define one or more of the operations, functions, processes, or methods used in the development or operation of a neural network, the application of a machine learning technique or techniques, or the development or implementation of an appropriate data aggregation or decision process. Note that a neural network or deep learning model may be characterized in the form of a data structure in which are stored data representing a set of layers containing nodes, and connections between nodes in different layers are created (or formed) that operate on an input to provide a decision or value as an output.

In general terms, a neural network may be viewed as a system of interconnected artificial "neurons" that exchange messages between each other. The connections have numeric weights that are "tuned" during a training process, so that a properly trained network will respond correctly when presented with an image or pattern to recognize (for example), In this characterization, the network consists of multiple layers of feature-detecting "neurons"; each layer has neurons that respond to different combinations of inputs from the previous layers. Training of a network is performed using a "labeled" dataset of inputs in a wide assortment of representative input patterns that are associated with their intended output response. Training uses general-purpose methods to iteratively determine the weights for intermediate and final feature neurons. In terms of a computational model, each neuron calculates the dot product of inputs and weights, adds the bias, and applies a non-linear trigger or activation function (for example, using a sigmoid response function).

Any of the software components, processes or functions described in this application may be implemented as software code to be executed by a processor using any suitable computer language such as, for example, Java, JavaScript, C++ or Perl using, for example, conventional or object-oriented techniques. The software code may be stored as a series of instructions, or commands in (or on) a non-transitory computer-readable medium, such as a random-access memory (RAM), a read only memory (ROM), a magnetic medium such as a hard-drive or a floppy disk, or an optical medium such as a CD-ROM. In this context, a non-transitory computer-readable medium is almost any medium suitable for the storage of data or an instruction set aside from a transitory waveform, Any such computer readable medium may reside on or within a single computational apparatus and may be present on or within different computational apparatuses within a system or network.

According to one example implementation, the term processing element or processor, as used herein, may be a central processing unit (CPU), or conceptualized as a CPU (such as a virtual machine), In this example implementation, the CPU or a device in which the CPU is incorporated may be coupled, connected, and/or in communication with one or more peripheral devices, such as display. In another example implementation, the processing element or processor may be incorporated into a mobile computing device, such as a smartphone or tablet computer.

The non-transitory computer-readable storage medium referred to herein may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, synchronous dynamic random access memory (SDRAM), or similar devices or other forms of memories based on similar technologies. Such computer-readable storage media allow the processing element or processor to access computer-executable process steps, application programs and the like, stored on removable and non-removable memory media, to off-load data from a device or to upload data to a device. As mentioned, with regards to the embodiments described herein, a non-transitory computer-readable medium may include almost any structure, technology or method apart from a transitory waveform or similar medium.

Certain implementations of the disclosed technology are described herein with reference to block diagrams of systems, and/or to flowcharts or flow diagrams of functions, operations, processes, or methods. It will be understood that one or more blocks of the block diagrams, or one or more stages or steps of the flowcharts or flow diagrams, and combinations of blocks in the block diagrams and stages or steps of the flowcharts or flow diagrams, respectively, can be implemented by computer-executable program instructions. Note that in some embodiments, one or more of the blocks, or stages or steps may not necessarily need to be performed in the order presented or may not necessarily need to be performed at all.

These computer-executable program instructions may be loaded onto a general-purpose computer, a special purpose computer, a processor, or other programmable data processing apparatus to produce a specific example of a machine, such that the instructions that are executed by the computer, processor, or other programmable data processing apparatus create means for implementing one or more of the functions, operations, processes, or methods described herein. These computer program instructions may also be stored in a computer-readable memory that can direct a computer or other programmable data processing apparatus to function in a specific manner, such that the instructions stored in the computer-readable memory produce an article of manufacture including instruction means that implement one or more of the functions, operations, processes, or methods described herein.

While certain implementations of the disclosed technology have been described in connection with what is presently considered to be the most practical and various implementations, it is to be understood that the disclosed technology is not to be limited to the disclosed implementations. Instead, the disclosed implementations are intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural and/or functional elements that do not differ from the literal language of the claims, or if they include structural and/or functional elements with insubstantial differences from the literal language of the claims.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely indented to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments of the disclosed subject matter and does not pose a limitation to the scope of the embodiment(s) unless otherwise claimed. No language in the specification should be construed as indicating any non-claimed element as essential to each embodiment.

Different arrangements of the components depicted in the drawings or described above, as well as components and steps not shown or described are possible. Similarly, some features and sub-combinations are useful and may be employed without reference to other features and sub-combinations. Embodiments have been described for illustrative and not restrictive purposes, and alternative embodiments will become apparent to readers of this patent. Accordingly, the embodiments are not limited to the embodiments described above or depicted in the drawings, and various embodiments and modifications can be made without departing from the scope of the claims below.

That which is claimed is:

1. A system for automatically navigating between a plurality of web pages to perform a desired task by performing a plurality of actions, with an action or actions of the plurality of actions associated with each of the plurality of webpages, the system comprising:
    an electronic processor programmed with a set of executable instructions;
    an electronic data storage in which are stored the set of executable instructions, wherein when executed, the instructions, cause the system to implement
    a first process to navigate to a first webpage;
    a second process to extract one or more intent model features from the first webpage, the one or more intent model features including both visual and textual features, wherein the visual features include an image of the first webpage and the textual features include one or more of text contained in a document object model or file describing elements of the first webpage and text visible on the first webpage;
    a third process to access a trained intent model, provide the extracted intent model features from the first webpage to the trained intent model and obtain as an output a prediction of an action or actions associated with the first webpage;
    a fourth process to extract one or more target model features from the first webpage, the one or more target model features including both visual and textual features, wherein the visual features include an image of an element or elements on the first webpage and the textual features include one or more of text contained in a document object model or file describing elements of the first webpage and text visible on the first webpage;
    a fifth process to access a trained target model, provide the extracted target model features from the first webpage and the prediction of the action or actions associated with the first webpage to the trained target model and obtain as an output a prediction of which of the elements of the first webpage will cause each of the action or actions associated with the first webpage to be performed;
    a sixth process to execute one of the actions associated with the first webpage by interacting with the highest ranked element of the first webpage predicted by the trained target model for that action, wherein executing the one of the actions results in either navigating to a second webpage or performing the desired task; and
    a seventh process to repeat the second, third, fourth, fifth and six processes on the second webpage and on any subsequent webpages until the desired task is performed.

2. The system of claim 1, wherein the trained intent model comprises a multiple component model, and further, wherein the trained intent model utilizes one or more of natural language processing and a machine learning technology to predict the action or actions associated with the first webpage.

3. The system of claim 2, wherein the trained intent model applies a convolutional neural network to evaluate the visual features of the first webpage and a natural language processing model to evaluate the text contained in the document object model or file describing elements of the first webpage and text visible on the first webpage.

4. The system of claim 3, wherein instead of the convolutional neural network, the machine learning technology is one or more of a Support Vector Machine, a Decision Tree, a Recurrent Neural Network, Naive Bayes, Max Entropy, and Conditional Random Fields.

5. The system of claim 2, wherein the natural language processing technology is one or more of lemmatization, stemming, tokenization, part-of-speech tagging, word embedding, Latent Dirichlet allocation, and Latent Semantic Analysis.

6. The system of claim 2, further comprising forming an ensemble of the results obtained from the one or more natural language processing and machine learning technologies.

7. The system of claim 1, wherein the trained target model comprises a multiple component model, and further, wherein the trained target model utilizes one or more of natural language processing and a machine learning technology to predict which of the elements of the first webpage will cause each of the action or actions associated with the first webpage to be performed.

8. The system of claim 7, wherein the trained target model applies a convolutional neural network to an image of an element on the first webpage and a natural language processing model to evaluate the text contained in the document object model or file describing the element on the first webpage and text visible on the first webpage and associated with the element.

9. The system of claim 8, wherein instead of the convolutional neural network, the machine learning technology is one or more of a Support Vector Machine, a Decision Tree, a Recurrent Neural Network, Naive Bayes, Max Entropy, and Conditional Random Fields.

10. The system of claim 7, wherein the natural language processing technology is one or more of lemmatization, stemming, tokenization, part-of-speech tagging, word embedding, Latent Dirichlet allocation, and Latent Semantic Analysis.

11. The system of claim 7, further comprising forming an ensemble of the results obtained from the one or more natural language processing and machine learning technologies.

12. The system of claim 1, further comprising instructions, which when executed, cause the system to store a record of which of the extracted target model features have been interacted with and which actions have been executed for each webpage, and further, cause the system to determine if executing the most recently executed action associated with a webpage has increased or decreased the likelihood of performing the desired task.

13. The system of claim 1, wherein the action or actions associated with the first webpage comprises one or more of inserting text in a field, selecting a user interface element, selecting a menu item, accessing data, logging into a system, and navigating to a different webpage.

14. A method for automatically navigating between a plurality of web pages to perform a desired task by performing a plurality of actions, with an action or actions of the plurality of actions associated with each of the plurality of webpages, the method comprising:
navigating to a first webpage;
extracting one or more intent model features from the first webpage, the one or more intent model features including both visual and textual features, wherein the visual features include an image of the first webpage and the textual features include one or more of text contained in a document object model or file describing elements of the first webpage and text visible on the first webpage;
providing the extracted intent model features from the first webpage to a trained intent model and obtain as an output a prediction of an action or actions associated with the first webpage;
extracting one or more target model features from the first webpage, the one or more target model features including both visual and textual features, wherein the visual features include an image of an element or elements on the first webpage and the textual features include one or more of text contained in a document object model or file describing elements of the first webpage and text visible on the first webpage;
providing the extracted target model features from the first webpage and the prediction of the action or actions associated with the first webpage to a trained target model and obtain as an output a prediction of which of the elements of the first webpage will cause each of the action or actions associated with the first webpage to be performed;
executing one of the actions associated with the first webpage by interacting with the highest ranked element of the first webpage predicted by the trained target model for that action, wherein executing the one of the actions results in either navigating to a second webpage or performing the desired task; and
if the desired task is not performed, then repeating the second, third, fourth, fifth and six processes on the second webpage and on any subsequent webpages until the desired task is performed.

15. The method of claim 14, wherein the trained intent model applies a convolutional neural network to evaluate the visual features of the first webpage and a natural language processing model to evaluate the text contained in the document object model or file describing elements of the first webpage and text visible on the first webpage.

16. The method of claim 15, wherein the natural language processing technology is one or more of lemmatization, stemming, tokenization, part-of-speech tagging, word embedding, Latent Dirichlet allocation, and Latent Semantic Analysis.

17. The method of claim 15, wherein instead of the convolutional neural network, the machine learning technology is one or more of a Support Vector Machine, a Decision Tree, a Recurrent Neural Network, Naive Bayes, Max Entropy, and Conditional Random Fields.

18. The method of claim 14, wherein the trained target model applies a convolutional neural network to an image of an element on the first webpage and a natural language processing model to evaluate the text contained in the document object model or file describing the element on the first webpage and text visible on the first webpage and associated with the element.

19. The method of claim 14, further comprising storing a record of which of the extracted target model features have been interacted with and which actions have been executed for each webpage, and further, determining if executing the most recently executed action associated with a webpage has increased or decreased the likelihood of performing the desired task.

20. The method of claim 14, wherein the action or actions associated with the first webpage comprises one or more of inserting text in a field, selecting a user interface element, selecting a menu item, accessing data, logging into a system, and navigating to a different webpage.

\* \* \* \* \*